United States Patent [19]
Maeda et al.

[11] Patent Number: 5,420,838
[45] Date of Patent: May 30, 1995

[54] DISK RECORDING AND REPRODUCING DEVICE

[75] Inventors: Shigemi Maeda, Yamatokoriyama; Shigeo Terashima, Tenri; Toshio Ishikawa; Toshihisa Deguchi, both of Nara, all of Japan

[73] Assignee: Sharp Kabushiki Kaisha, Osaka, Japan

[21] Appl. No.: 25,801

[22] Filed: Mar. 3, 1993

Related U.S. Application Data

[63] Continuation of Ser. No. 545,194, Jun. 28, 1990, abandoned.

[30] Foreign Application Priority Data

| Jun. 30, 1989 | [JP] | Japan | 1-170649 |
| Jun. 30, 1989 | [JP] | Japan | 1-170650 |
| Jun. 30, 1989 | [JP] | Japan | 1-170651 |
| Jun. 30, 1989 | [JP] | Japan | 1-170652 |
| Jun. 30, 1989 | [JP] | Japan | 1-170653 |
| Aug. 4, 1989 | [JP] | Japan | 1-203230 |

[51] Int. Cl.⁶ .............................................. G11B 7/00
[52] U.S. Cl. .................................. 369/32; 369/44.33; 369/48; 369/53
[58] Field of Search .................... 369/32, 44.32, 44.33, 369/48, 53, 54; 360/69

[56] References Cited

U.S. PATENT DOCUMENTS

| 4,301,482 | 11/1981 | Trevithick | 369/32 |
| 4,779,252 | 10/1988 | Custers et al. | 369/32 |
| 4,821,251 | 4/1989 | Hosoya | 369/54 |
| 4,835,757 | 5/1989 | Abiko . | |
| 4,855,842 | 8/1989 | Hayes et al. | 369/32 |
| 4,872,151 | 10/1989 | Smith | 369/32 |
| 4,885,735 | 12/1989 | Fukushima et al. | 369/54 |
| 4,907,216 | 3/1990 | Rijnsburger | 369/275 |
| 4,922,476 | 5/1990 | Kiyoura et al. | 369/32 |
| 4,932,016 | 6/1990 | Yoshida et al. | 369/48 |
| 4,984,230 | 1/1991 | Satoh et al. | 369/54 |
| 5,068,842 | 11/1991 | Naito | 369/32 |
| 5,075,804 | 12/1991 | Deyring | 369/32 |
| 5,130,969 | 7/1992 | Sako | 369/53 |
| 5,153,861 | 10/1992 | Maeda et al. | 369/32 |

FOREIGN PATENT DOCUMENTS

| 0203562 | 12/1986 | European Pat. Off. . |
| 0283304 | 9/1988 | European Pat. Off. . |
| 0292917 | 11/1988 | European Pat. Off. . |
| 0363186 | 4/1990 | European Pat. Off. . |
| 0376756 | 7/1990 | European Pat. Off. . |
| 0417277 | 3/1991 | European Pat. Off. . |
| 63-222379 | 9/1988 | Japan . |
| 64-39632 | 2/1989 | Japan . |
| 1143081 | 6/1989 | Japan . |
| 1179275 | 7/1989 | Japan . |
| 2088088 | 6/1982 | United Kingdom . |
| 2101793 | 1/1983 | United Kingdom . |

OTHER PUBLICATIONS

"Providing Security Erasure of a Deleted Disk or Disk Document" (IBM Technical Disclosure Bulletin, vol. 25, No. 12, May 1983, pp. 6680–6682).
The English Abstract of Japanese No. 63-222379; Sony Corp.
The Art of Digital Audio; John Watkinson; Jan. 1988; p. 1 and pp. 441 to 487.
Zukai Compact Disk Dokuhon (Illustrative Compact Disk Handbook) Second edition, Apr. 25, 1988.

Primary Examiner—Gail O. Hayes
Assistant Examiner—Jennifer L. Hazard

[57] ABSTRACT

A disk recording and reproducing device records and reproduces information on and from a magneto-optical disk having 3 3 and there is TOC (Table of Contents) area. Additional information with respect to each piece of the information recorded in the information recording area is recorded in the TOC. The device includes operation keys, a TOC memory for storing read/write control information for desired pieces of information entered through the operation keys. There is an optical head and a magnetic coil for recording, in the TOC area, the contents stored in the TOC memory as additional information. A controller controls the read/write operation to the disk according to the read/write control information. With the arrangement, a user can recognize necessary/unnecessary information and defective parts in the disk, and therefore make effective use thereof as well as maintaining secrecy of the information.

20 Claims, 21 Drawing Sheets

DISK RECORDING AND REPRODUCING DEVICE

This application is a continuation of application Ser. No. 07/545,194, filed on Jun. 28, 1990, now abandoned.

FIELD OF THE INVENTION

The present invention relates to a disk recording and reproducing device for recording as well as reproducing information, for example, music information on and from a writable disk having absolute addresses.

BACKGROUND OF THE INVENTION

Conventionally, there are known compact disks (hereinafter called CD) as a disc shaped recording medium wherein pieces of information such as music programs are recorded by converting them into digital signals.

These CD's are used only for reproduction, and for those used for music programs, a plurality of music programs are successively recorded on the disk. At the innermost track, what we call a lead-in area thereof, there is created a so-called TOC (Table Of Content) area wherein for example recording start positions with respect to each music program are recorded.

When a CD is placed into a reproducing device for reproduction, information recorded in the TOC area is first reproduced, and then by the information, the number of music programs, recording start time (position) for example, and the of each program, recorded in the CD placed therein, are recognized, and in the reproducing operations thereafter, an access to any music program is performed in short time by using the information recorded in the TOC area.

In the meantime, since those CD's are used only for reproduction, as a new method, it has been desired to develop a disk recording and reproducing device whereby the user can freely record for example music programs on a recording medium. In that case, as the recording medium, it is suggested to apply magneto-optical disks or the like functioning as a re-writable recording medium. Moreover, the disk recording and reproducing device is preferably designed to have an interchangeability so that it can also reproduce conventional CD's.

As to a recording method in the above arrangement, in order to perform CLV (Constant Linear Velocity) control to the disk, which is executed in the conventional CD's, it is suggested that grooves wobbling according to values of absolute addresses or pits indicating absolute addresses are formed on the disk when it was fabricated, and that, in recording information thereon, accesses to unrecorded parts and the CLV control are performed by using the above absolute addresses, and the same signal formats as those in the conventional CD's are employed.

Furthermore, in the above re-writable disk, at the time when a recording operation for each music program has been finished, the absolute addresses indicating the recording start position and recording end position thereof are successively recorded in the TOC area while corresponding those absolute addresses to the program numbers, and in the reproductions thereafter the absolute addresses recorded therein are of great use.

In that case, when a piece of information recorded in an information recording area is rewritten, it is necessary to replace the contents of the TOC area according to the change.

For example, as shown by (a) in FIG. 23, when music programs from the first program M1 to fourth program M4 are recorded in the information recording area, as shown in Table 1, the program number and the recording start position as well as recording end position for each of the music programs M1 to M4 are recorded as additional information.

TABLE 1

| Program No. | Recording Start Position | Recording End Position |
| --- | --- | --- |
| 01 | (00'00") | (08'37") |
| 02 | (08'40") | (23'12") |
| 03 | (23'16") | (39'41") |
| 04 | (39'48") | (55'30") |

Next, as shown by (b) in FIG. 23, in the case where another music program M2' is newly recorded in an area wherein the second program M2 has already been recorded, if the latter half of the second program M2 remaining after the recording end position of the M2' is considered to be unnecessary information, it is only necessary to rewrite additional information with respect to the second program in the contents of the TOC area, as shown in Table 2.

TABLE 2

| Program No. | Recording Start Position | Recording End Position |
| --- | --- | --- |
| 01 | (00'00") | (08'37") |
| 02 | (08'40") | (14'56") |
| 03 | (23'16") | (39'41") |
| 04 | (39'48") | (55'30") |

However, as shown by (c) in FIG. 23, in the case where another music program M2' is recorded in the area wherein the second program M2 has been recorded, when M2' is longer than the former second program M2, the former third program M3 is partially erased. In that case, if the remaining part of the former third program M3 is considered to be unnecessary information, the contents of the TOC area are replaced as shown in Table 3. More specifically, on the one hand, additional information with respect to the second program is rewritten, and on the other hand, the program number is changed and the former fourth program is moved up to be the third program. Accordingly, in that case, in order to rewrite the information in the TOC area, at least, pieces of information shown by the program numbers "02" and "03" in Table 1 should be rewritten into pieces of information shown by the program numbers "02" and "03" in Table 3, and a piece of information shown by "04" in Table 1 should be erased. When this method is adapted to a case where, for example, there are program numbers from "01" to "30", it requires a lot of time to rewrite the information recorded in the TOC area.

TABLE 3

| Program No. | Recording Start Position | Recording End Position |
| --- | --- | --- |
| 01 | (00'00") | (08'37") |
| 02 | (08'40") | (32'09") |
| 03 | (39'48") | (55'30") |

Moreover, as to the capacity of the TOC area, it is suggested to give a capacity requiring, for example, several tens of second in reproduction, however, in the case where the disk recording and reproducing device is designed to reproduce information in all the TOC area when the disk is placed therein, reproducing time for all the capacity of the TOC area is required even if actual additional information recorded therein is very little compared with the capacity of the TOC area, and therefore a problem arises in that waiting time required to reach a stand-by state is very long.

Furthermore, in the aforementioned disk recording and reproducing device, for example, in recording music programs recorded on another recording medium as a music source, it is possible for the user himself to instruct to start a recording operation through operation keys by choosing a right timing while listening to the music program coming from the music source.

However, in the recording operations for such music programs, the leading part of the music program is sometimes not recorded due to wrong timing in starting the recording operation, and the user suspends the operation halfway when he notices the wrong timing, and then he resumes the recording operation. In that case, it is suggested that, in order to start a recording to be resumed from a position conforming to the start position of the former music program (the music program having been failed in recording), an absolute address indicating the start position is predeterminately stored, and that, in resuming the recording operation, the recording is operated after returning to the position indicated by the absolute address.

More concretely, as shown in FIG. 24, assuming that the recording of the music program having been failed in recording is started from a position shown by F in the figure on a track 59 formed in a spiral state (the recorded part is shown by hatching in the figure), in resuming the recording operation, after accessing an optical head to a position indicated by an absolute address F' of the recording start position predeterminately stored, it is kept in a stand-by state while being permitted to make a track-jump to the inner track every rotation of the disk. In this case, assuming that the track-jump is made from a position G to a position G' in the figure, the route of a light spot is expressed by a loop shown in an alternate long and short dash line in the figure. Therefore, as shown in FIG. 25, signals contained within the section traced back by one rotation are repeatedly reproduced.

However, if the user operates the operation keys at his will during the aforementioned stand-by state, as shown in FIG. 26, the recording operation is sometimes performed from a position H located away past the recording start position F of the former music program. In other words, within the section tracked by one rotation during the aforementioned stand-by state, there is contained a recording area of the former music program, that is, a range shown by F to G, and it is possible that a recording of a new music program is started from H within the range.

In the case above-mentioned, there remains the former music program located in the section F to H. As a result, in reproduction, the leading part of the former music program is reproduced, although it might be a short period of time, thereby presenting a problem in that the quality of the music program is affected.

In the meantime, when there are scratches or the like on a magneto-optical disk caused when it was fabricated or due to ill usage by the user, malfunction might arise in recording or reproducing music information or the like thereon or therefrom. Especially in the case of recording successive information of music or the like, even a defect in a part of the disk might cause interruption of the recording from the point on, and might also cause damage on the information already stored in the other areas. Further, in the case of re-writable disks such as magneto-optical disks, the above problems might occur every time a rewriting operation is performed on the disk.

To deal with such problems, at present, only we can do is to stop using the disk even if it has a defect only in a part thereof, or to find the defective part and avoid using the defective area in recording by making a note for ourselves to recognize where the defective area is located.

Moreover, in the case where a copying (analog copying) operation for music information is performed from the disk recording and reproducing device to an external recording device, as with the conventional method, the user has to determine a reproducing level and a recording level at the disk recording and reproducing device as a reproducing device and at the external device as a recording device while examining level meters or the like.

In performing such copying operations, generally, it is necessary to determine the levels of reproduction and recording so that the value of the peak level of the reproduction can be settled within a permissible range of the recording level of the external recording device. However, since the determination of the levels must be made while monitoring a peak level only appearing momentarily, those operations are difficult as well as troublesome for the user.

In the meantime, when it is permitted for the user to freely record his desired music programs or the like, he may want to preserve his specially favorite and important music programs as long as he likes, and therefore for such demands it is suggested to give write protection to every disk.

However, to give write protection to every disk means to perform write protection uniformly over the whole information recorded in a disk, and therefore it is not possible to give write protection to each of music programs respectively. Consequently, in this system it is not possible to erase or rewrite unnecessary music programs with necessary music programs kept remaining in the disk, and the system has a drawback in that advantages of re-writable disk are not fully exhibited. The drawback is common in the case where the information is ordinary data or the like, not being limited to the music programs (music information).

One of the objects of the present invention is to solve the above problem; however, by the use of the invention, when write protection is applied to each music program, and then a new music program is recorded in a non-write-protection range, there arises a case where the capacity of the non-write-protection range (range where write protection is not applied) is smaller than the capacity required to record the new music program therein. Therefore, in reproducing from the disk wherein such recordings are made, the performance of the newly recorded music program is finished halfway, and simultaneously with the finishing, the performance of the music program recorded in a write protection range is started. Consequently, a drawback is presented in that the listener feels displeased because of having a missing part at the end of the music program.

Furthermore, besides the above, the following various demands are presented when the user wants to record on a disk music information of his own make. It is a demand to keep secrecy from others about the recorded information. Since the information with respect to the above demand for secrecy is mostly very important, it is another demand to keep the important information from being erased due to ill operation by others. It is a further demand to avoid making high-quality copies although the demand for secrecy is not asked so strictly. Therefore, by adding functions to meet the above demands, the present invention aims at providing a disk recording and reproducing device having full functions.

SUMMARY OF THE INVENTION

It is a general object of the present invention to provide a disk recording and reproducing device wherein erasing operation, rewriting operation and the like only for unnecessary information can be performed with necessary information left untouched.

It is a more specific object of the present invention to provide a disk recording and reproducing device wherein in reproducing music information recorded in a non-write-protection range, the sound gradually decreases before the end of the music information, and therefore, since it is completed without giving the impression of a missing part at the end, it is avoidable to give unpleasant feeling to the listener.

It is another object of the present invention to provide a disk recording and reproducing device wherein as to only defective parts of a disk, the use thereof is eliminated, and other available parts thereof are effectively used.

It is still another object of the present invention to provide a disk recording and reproducing device wherein such inefficiency as to reproduce all the TOC area is eliminated, and therefore required reproducing time for the TOC area is shortened.

It is a further object of the present invention to provide a disk recording and reproducing device wherein in the case where a copying operation for music information is performed from the disk recording and reproducing device to an external recording device, preferable copying operation is readily performed by utilizing peak level information recorded in the TOC area effectively.

It is a still further object of the present invention to provide a disk recording and reproducing device wherein maintenance of secrecy is possible on desired pieces of recorded information.

It is another object of the present invention to provide a disk recording and reproducing device wherein it is preventable for another person to rewrite another information in a range having information already recorded therein and given a read protection thereto.

It is still another object of the present invention to provide a disk recording and reproducing device wherein it is preventable to make high-quality copies of desired pieces of recorded information.

A further object of the present invention is to provide a disk recording and reproducing device wherein in re-recording a piece of information, an optical head is readily accessed to a vicinity of a recording start position of the former recorded information.

A still further object of the present invention is to provide a disk recording and reproducing device wherein in re-recording a piece of information, re-recording operation is performed with complete overlapping, and therefore it is surely preventable that the leading part of the former recorded information might be reproduced.

In order to achieve the above objects, a disk recording and reproducing device of the present invention, which records and reproduces information on and from a re-writable disk having absolute addresses and comprising an information recording area wherein pieces of information entered from external devices are recorded and a TOC area wherein additional information with respect to each piece of the information recorded in the information recording area is recorded, is characterized in comprising: operation keys which are operable by the user; memory means for storing read/write control information to predetermined pieces of information entered by the operation keys; recording means for recording in the TOC area the contents stored in the memory means as additional information; and control means for controlling read/write operation to the re-writable disk according to the read/write control information.

With the above arrangement, since write control to each piece of information or write protection is possible, erasing operation, rewriting operation or the like only for unnecessary information can be performed with necessary information remaining recorded, and therefore advantages of re-writable disk are fully exhibited.

Moreover, when the information is given as music information, fade-out processing is applied to the music information being recorded before the end of a non-write-protection range where a write protection is not given. Accordingly, when the music information is reproduced, the sound gradually decreases before the end of the music information, and therefore, since the music information is completed without giving the impression of a missing part at the end, it is avoidable to give unpleasant feeling to the listener.

Furthermore, with the above arrangement, in the case where there are pieces of information recorded on a disk, on which the user wants to maintain secrecy from others, a pass word, which functions as read control information to the piece of information, is entered to the disk recording and reproducing device, and thereafter, only a person who knows the pass word can access to the desired piece of recorded information, thereby maintaining the secrecy to the desired pieces of recorded information.

Moreover, by the read/write control, since write control or a write protection is automatically applied to the piece of information having a read protection if an entered pass word doesn't agree with the pass word already recorded, it is preventable for another person who doesn't know the pass word to rewrite on a range containing recorded information and having a read protection, by misunderstanding that there is no information recorded in the area because the recorded information therein having read control information or having the read protection isn't reproduced. Thus, erasing important information is avoidable.

Furthermore, by the read control, it is preventable to provide high-quality copies of desired pieces of recorded information to an external recording device, and therefore a lowering of information value due to letting others copy important information is avoidable.

Another disk recording and reproducing device of the present invention, which records and reproduces information on and from a re-writable disk having absolute addresses and comprising an information recording area wherein pieces of music information entered from external devices are recorded and a TOC area wherein additional information with respect to each piece of the music information recorded in the information recording area is recorded, is characterized in comprising: a peak level detection circuit for detecting a peak level of the music information; memory means for storing peak level information with respect to the peak level; and recording means for recording the contents stored in the memory means in the TOC area as additional information.

With the above arrangement, in the case where a copying operation for music information is performed from the disk recording and reproducing device to an external recording device, preferable copying operation is readily performed by utilizing peak level information recorded in the TOC area effectively.

For example, by utilizing peak level value information as one piece of peak level information, and after properly adjusting reproducing levels automatically according to the values, a piece of music information is reproduced, and then is released to the external recording device. Thus, the arrangement saves the user the trouble of setting the levels by himself, and permits him to readily perform preferable copying operation.

Further, for example, by utilizing peak level generation positional information as one piece of peak level information, a peak level part of a piece of music information is reproduced repeatedly. Then, by monitoring the repeated reproduction, the user can readily perform the setting of reproducing or recording level before the actual recording of the music information. More specifically, as aforementioned, by obtaining a peak level repeatedly, which normally appears only in an instant, the setting of reproducing and recording levels is performed easily and promptly.

Furthermore, for example, by utilizing the peak level value information as a piece of peak level information, a reference signal having an equivalent level is produced according to the value, and by using the reference signal produced, the user can readily perform the setting of reproducing or recording level before the actual recording of music information. More specifically, by using the reference signal being successively released instead of the peak level only appearing in an instant, the setting of reproducing and recording levels is performed easily and promptly.

Another disk recording and reproducing device of the present invention, which records and reproduces information on and from a re-writable disk having absolute addresses and comprising an information recording area wherein pieces of information entered from external devices are recorded and a TOC area wherein additional information with respect to each piece of the information recorded in the information recording area is recorded, is characterized in comprising: defective part recognition means for recognizing defective parts of the disk; memory means for storing defective part information from the defective part recognition means; recording means for recording in the TOC area the contents stored in the memory means as additional information; and control means for inhibiting the reproduction and recording of information in the defective parts according to the defective part information.

With the above arrangement, in a disk containing a defective part in a section thereof, only the use of the defective part in the section thereof is eliminated, and other available parts thereof are effectively used. Therefore, conventionally, although the abandonment of the disk was necessary only because it had a defective part in a section thereof, such a wasteful use of disks is avoidable. Further, since the defective part information is recorded in the TOC area of the disk, it is not necessary for the user to make a note so as to recognize where the defective part is, and the disk recording and reproducing device itself can take proper measures by obtaining the defective part information before the recording or reproduction of music information without giving the trouble to the user.

In addition, in the defective part information, a defective part can be indicated by using an absolute address corresponding thereto. Moreover, various other functions can be added by utilizing the absolute addresses. For example, by displaying the above absolute addresses on the device, the user can recognize where the defective parts (defective area) are. Furthermore, on the display having areas capable of lighting on in the form of bars indicating specific areas thereof, by forming bright and dark areas respectively corresponding to defective areas and used areas in the same displaying manner, the user can recognize writable areas clearly and promptly.

Moreover, as to the recognition of defective parts, either the device can accept defective part information entered by user, as it is, or the device itself can recognize defective parts after judging them. As an example of the judgement by the device itself, one of such methods is proposed, wherein it is judged whether absolute addresses being successively read in recording or reproduction are incrementing/decrementing in a regular order, and if they are not varying in the regular order, it is judged that track-jump or the like has occurred, and the corresponding absolute addresses are judged as defective parts.

Another disk recording and reproducing device of the present invention, which records and reproduces information on and from a re-writable disk having absolute addresses and comprising an information recording area wherein pieces of information entered from external devices are recorded and a TOC area wherein additional information with respect to each piece of the information recorded in the information recording area is recorded, is characterized in comprising: recording means, whereby information is recorded in the information recording area, and on the one hand, additional information with respect to the recorded information is recorded in the TOC area, and on the other hand, an end mark is recorded in the rear end part of the additional information in the TOC area; and when a new piece of information is recorded in the information recording area, additional information with respect to the new piece of information is overwritten to add onto the end mark already recorded in the TOC area, and an end mark is newly recorded in a rear end part of the additional information overwritten to add thereto.

With the above arrangement, since the end mark is recorded upon finishing the recording of additional information to the TOC area, such inefficiency as to reproduce all the TOC area is eliminated by finishing the reproduction of the TOC area upon reproducing the end mark during the reproduction thereof, and therefore required reproducing time for the TOC area is shortened.

Moreover, when a new piece of information is overwritten in the information recording area having information already recorded, additional information with respect to the piece of information newly recorded is overwritten to add onto the end mark, if necessary, and the end mark is newly recorded in the rear end part of the additional information. In the other words, since only the additional information with respect to the newly recorded information is recorded to add to the TOC area, the need for rewriting the additional information already recorded is eliminated, and therefore required rewriting time for the TOC area is shortened.

However, in the arrangement, in the case where a new piece of information is overwritten in a range of the information recording area having information already recorded, besides the additional information with respect to the former information, in the TOC area there is recorded additional information with respect to the new piece of information recorded in the same range. In that case, after reproducing the contents of the TOC area and storing them in a memory section of the disk recording and reproducing device, editing processing on the contents of the memory section can be performed by judging the additional information recorded in a latter part of the TOC area, that is, only the additional information with respect to the new information as effective additional information.

Furthermore, in the case where pieces of additional information increase in number to flow over the TOC area by successively adding new pieces of additional information to the TOC area, or where the amount of the additional information becomes not less than a predetermined value, and the required reproducing time of the TOC area becomes not less than a predetermined required time, editing processing on the contents of the TOC area is performed, if necessary, by applying such processing as to erase pieces of additional information which become unnecessary because of overwriting operations or the like in the ranges of the information recording area having information already recorded.

Another disk recording and reproducing device of the present invention, which records and reproduces information on and from a re-writable disk having absolute addresses and comprising an information recording area wherein pieces of information entered from external devices are recorded, is characterized in comprising: an optical head for applying a light beam to the disk in recording the information, operation keys for being operated by the user, memory means wherein an absolute address corresponding to the time at which the operation key is operated to initiate the recording of the information is stored, and optical head drive control means for moving the optical head back to a vicinity of a position indicated by the absolute address stored in the memory means and for keeping the optical head in a stand-by state by making it perform track-jumps at a position slightly before the position indicated by the absolute address when the user judged that something was wrong with the recording of the information, and performs a predetermined operation to re-record the information.

With the above arrangement, since the absolute address indicating the recording start of the former information is stored in the memory means, upon re-recording information, the optical head is readily accessed to the vicinity of the recording start position of the former information, and therefore the arrangement makes it possible to promptly meet the demand for the re-recording operation. Thus, the optical head is kept in a stand-by state at a position slightly before the absolute address position corresponding to the recording start position of the former information, while performing track-jumps. Accordingly, in the above stand-by state, since the former information does not exist in an area within a loop expressed by the travelling locus of the optical head, upon starting the re-recording operation, the recording is initiated at a position before the former recording start position. Therefore, the re-recording operation is performed with complete overlapping, and it is surely preventable that the leading part of the former recorded information might be reproduced even if it is a short period of time.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic block diagram showing a disk recording and reproducing device.

FIG. 2 is a schematic plan view of a magneto-optical disk.

FIG. 3 is an explanatory diagram showing a format of data.

FIG. 4 is an explanatory diagram showing a format of absolute addresses.

FIG. 5, comprised of 5a, 5b, and 5c, is an explanatory diagram showing recording conditions of an information recording area.

FIG. 6 is a schematic block diagram showing a disk recording and reproducing device.

FIG. 7 is an explanatory diagram showing a condition wherein defective areas and a used area are displayed on a display means in the same manner.

FIG. 8 is a schematic block diagram showing a disk recording and reproducing device.

FIG. 9 is a schematic block diagram of a disk recording and reproducing device showing a modified example of FIG. 8.

FIG. 10 is a schematic block diagram of a disk recording and reproducing device showing another modified example of FIG. 8.

FIG. 11 is a schematic block diagram showing a disk recording and reproducing device.

FIG. 12 is an explanatory diagram showing a condition of write protection applied to the first to third music programs.

FIG. 13 is a schematic block diagram showing a disk recording and reproducing device.

FIG. 14 is an explanatory diagram showing relationship and the like between an input signal to a fader circuit and an output signal from the fader circuit.

FIG. 15 is a schematic block diagram showing a disk recording and reproducing device.

FIG. 16 is an explanatory diagram showing a condition of read protection applied to the first to third music programs.

FIG. 17 is an explanatory diagram showing conditions of write protection and read protection applied to the first to third music programs.

FIG. 18 is a schematic block diagram showing a disk recording and reproducing device.

FIG. 20 is an explanatory diagram showing the position of an absolute address for recording start and the position of track-jumps, located on a track.

FIG. 21 is an explanatory diagram showing the position of the absolute address for the recording start and the position of the track-jumps, according to the time-axis.

FIG. 23, comprised of 23a, 23b, and 23c, is an explanatory diagram showing recording conditions of an information recording area.

FIG. 24 is an explanatory diagram showing the position of an absolute address for recording start and the position of track-jumps, located on a track.

FIG. 25 is an explanatory diagram showing the position of the absolute address for the recording start and the position of the track-jumps, according to the time-axis.

FIG. 26 is an explanatory diagram showing the position from which the re-recording is started in FIG. 25.

DESCRIPTION OF THE EMBODIMENTS

One embodiment of the present invention is described in detail as follows referring to FIGS. 1 to 5. In the present embodiment, a magneto-optical disk is employed as a re-writable disk, and the device is designed to record and reproduce music information or the like by the use of data formats standardized in CD's, and to perform reproduction of the conventional CD's as well.

Figure 2:
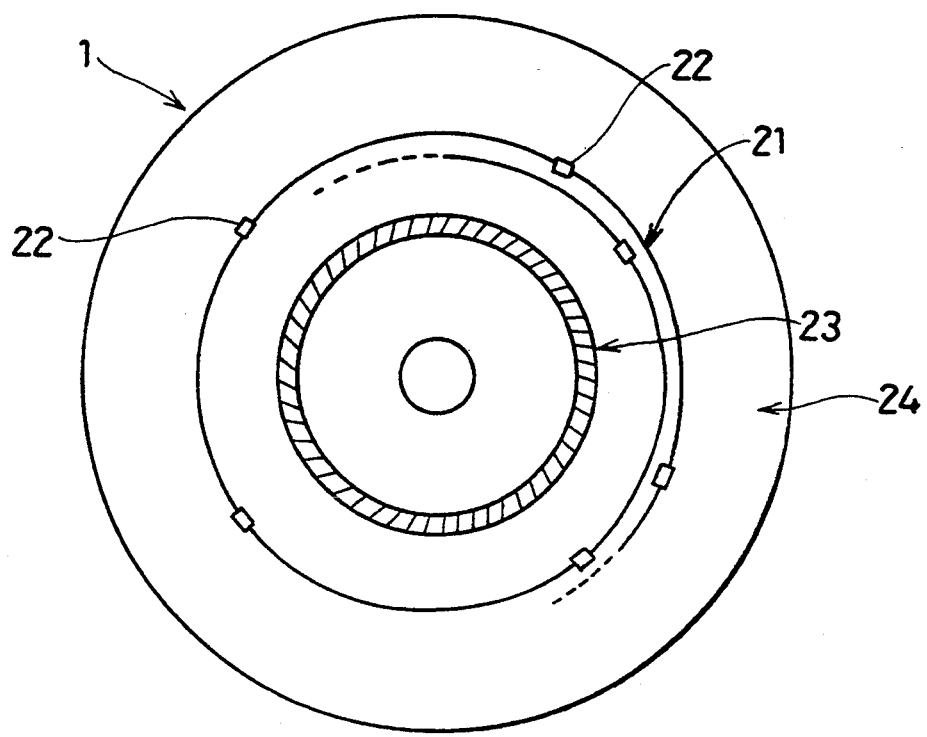

As is shown in FIG. 2, on a magneto-optical disk 1, there are predeterminately provided a track 21 in a spiral shape, and absolute addresses 22 in at least recording areas where recording and reproducing operations are performed. The recording areas include an information recording area 24 wherein information of music programs or the like recorded by the user, and a TOC area 23 located at the innermost track of the disk 1, wherein additional information with respect to each music program recorded in the information recording area 24 is recorded.

Figure 3:
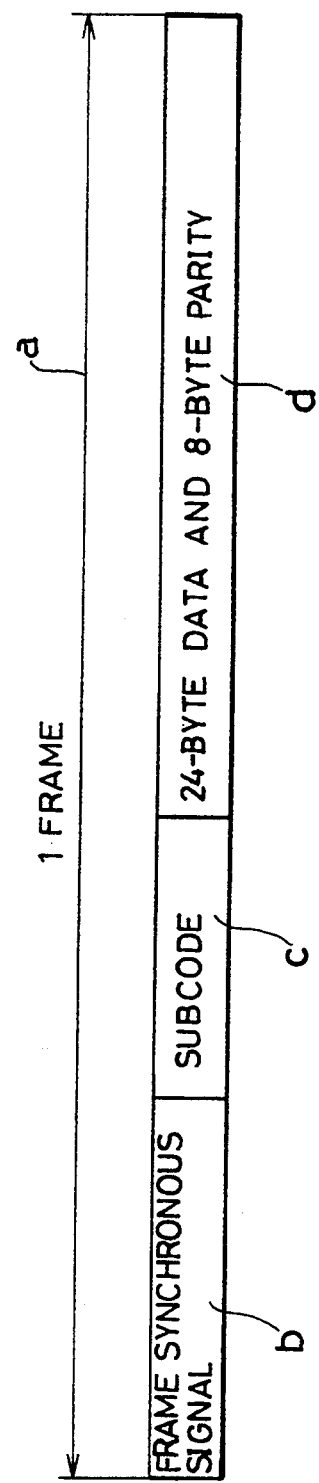

As to data formats for the pieces of information to be recorded in the TOC area 23 and the information recording area 24, the same data formats used in the conventional CD's are employed. More specifically, as shown in FIG. 3, information a of one frame comprises a frame synchronizing signal b, a data field d including data of 24 bytes for a music program or the like and an additional parity of 8 bytes for error detection and correction, and a sub-code c for recording a program number, time information and the like for each data field d. Pieces of the above-mentioned information a are successively recorded in the information recording area 24 and the TOC area 23. In addition, in the information recording area 24, since the sub-code c isn't particularly necessary, its contents can be predeterminately set.

Figure 4:
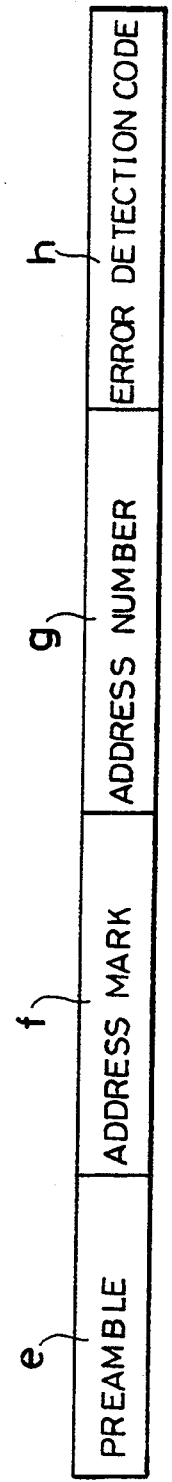

On the other hand, as shown in FIG. 4, each of the absolute addresses 22 comprises a preamble e for reproduction synchronization, an address mark f for indicating the leading part of the respective absolute addresses 22, an address number g for showing each address successively incrementing one by one from the innermost track of the magneto-optical disk 1(to be concrete, the absolute time in one second) and an error detection code h for detecting errors in recognizing the address numbers g, and those absolute addresses are predeterminately formed in a pit-like shape so that they are reproduced once every one second in a given linear velocity.

Figure 1:
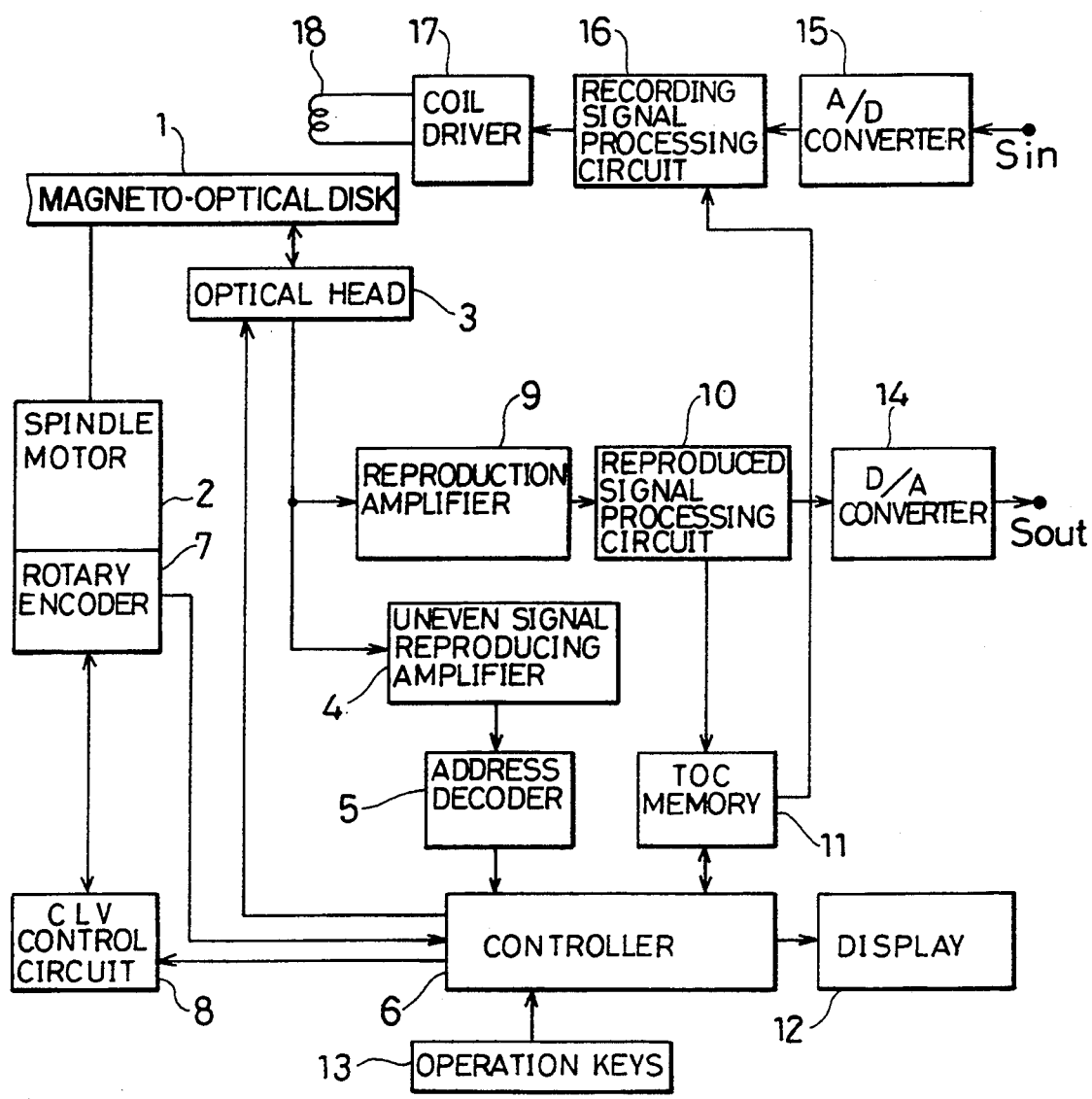
FIGS. 1 to 5 show one embodiment of the present invention.

FIG. 1 shows one example of a disk recording and reproducing device which performs recording and reproducing operations on and from a magneto-optical disk 1.

The magneto-optical disk 1 is rotatively driven by a spindle motor 2, and above the one side of the magneto-optical disk 1, is disposed an optical head 3 for applying a light beam onto the magneto-optical disk 1 so as to record or reproduce information thereon or therefrom. The optical head 3 and a magnetic coil 18, which will be described later, function as recording means.

Among pieces of information obtained through the optical head 3 in reproduction, an uneven signal component reproduced from the absolute addresses 22 is amplified by an uneven signal reproducing amplifier 4. The amplified uneven signal component is sent to an address decoder 5 where the value of the absolute address 22 is recognized, and then is sent to a controller 6 which executes control operation on the whole mechanisms of the disk recording and reproducing device. To the spindle motor 2, is connected a rotary encoder 7 which releases a predetermined number of pulses per one rotation synchronizing to the rotation thereof. The pulses from the rotary encoder 7 are entered to a CLV control circuit 8 and to a controller 6. The CLV control circuit 8 is designed to control rotation speed of the spindle motor 2 so that the linear velocity of the optical head 3 to the magneto-optical disk 1 can be kept constant according to the aforementioned pulses and to positional information of the optical head 3 released from the controller 6.

Moreover, by a reproduction amplifier 9 connected to the optical head 3, a magneto-optical signal component corresponding to each music program reproduced by the optical head 3 is amplified, and sent to a reproduced signal processing circuit 10. The reproduced signal processing circuit 10 processes the reproduced data of the music program or the like having a data format shown in FIG. 3 by selecting necessary data and sorting them, and performs error correction processing, if necessary.

Among the data processed by the reproduced signal processing circuit 10, additional information recorded in the TOC area 23 is stored in a TOC memory 11. In the TOC memory 11, are successively stored pieces of information specified by the user (specified through a group of operation keys 13 which will be described later). To the controller 6, is connected a display 12 which displays the additional information and the like stored in the TOC memory 11. To the controller 6, is also connected the group of operation keys 13 whereby the user executes various instructions.

By a D/A converter 14 connected to the reproduced signal processing circuit 10, digital data rows from the reproduced signal processing circuit 10 are converted to analog signals, and are released to the external device as analog signals $S_{out}$. On the other hand, analog signals $S_{in}$ for a music program entered from the external device are converted to digital signals by an A/D converter 15, and are sent to a recording signal processing circuit 16. The recording signal processing circuit 16 permits the music program from the A/D converter 15, or additional information or the like from the TOC memory 11 to be converted to signals having a data format respectively shown in FIG. 3, and produces recording signals. A coil driver 17 is designed to drive a magnetic coil 18 according to the recording signals from the recording signal processing circuit 16, and to permit the magnetic coil 18 to apply an external magnetic field to the magneto-optical disk 1 corresponding to the recording signals.

Here, the following description will discuss control operation for keeping the linear velocity of the magneto-optical disk 1 constant. When the magneto-optical disk 1 is placed on the spindle motor 2, the controller 6 on the one hand controls an optical head transportation system (not shown in Figures) to shift the optical head 3 to a position corresponding to the TOC area 23, and on the other hand gives positional information corresponding to the position to the CLV control circuit 8. According to the positional information given by the controller 6, the CLV control circuit 8 finds the number of rotation required to obtain a predetermined linear velocity, and also finds a pulse frequency reference value for the rotary encoder 7 corresponding to the number of the rotation. The CLV control circuit 8 then rotatively drives the magneto-optical disk 1 at the predetermined linear velocity by controlling the actual output pulse frequency of the rotary encoder 7 to have the same value with the pulse frequency reference value.

Then, absolute addresses 22 are released from the optical head 3 as reproduced signals, and after being amplified by the uneven signal reproducing amplifier 4 and being recognized their absolute addresses 22 by the address decoder 5, the absolute addresses 22 as those reproduced signals are entered to the controller 6. As to the aforementioned rotation control, however, the positional information does not necessarily conform to the actual position because of dispersions of machine accuracy and the like, and therefore it is difficult to obtain an accurate predetermined linear velocity. However, at this stage, no problems arise as long as the linear velocity error is within a range where at least absolute addresses 22 can be reproduced and recognized. The controller 6, since then, successively releases accurate positional information to the CLV control circuit 8 based on the values of the absolute addresses 22 released from the address decoder 5. Accordingly, thereinafter, an accurate CLV control operation is executed with or without the recorded information.

The following description will discuss a recording operation for music programs. Analog signals $S_{in}$ for a music program entered from the external device are converted into digital signals by the A/D converter 15, and by their format being converted to the aforementioned predetermined format through the recording signal processing circuit 16, recording signals are produced. According to the recording signals, the magnetic coil 18 is driven by the coil driver 17, and a magnetic field in response to the recording data is applied onto the magneto-optical disk 1.

With the above operation, from the optical head 3, a light beam with a comparatively large output is applied onto the magneto-optical disk 1. Magnetic coercive force lowers in a local part where a temperature rise has occurred by the application of the light beam. In the part where the magnetic coercive force has lowered, the direction of magnetization is reversed by the magnetic field applied by the magnetic coil 18, thereby permitting the information to be recorded. In addition, this method is generally referred to as magnetic field modulation method whereby rewriting on an area where recordings have already been made is possible by overwriting thereon.

On the other hand, in reproducing recorded music programs recorded in the information recording area 24, as is conventionally known, based on Kerr effect, polarizing components, whose plane of polarization is rotating in accordance with the direction of magnetization on the magneto-optical disk 1, of the light beam applied thereto are detected by the optical head 3, and are converted to a digital music program by the reproduced signal processing circuit 10 after being amplified by the reproduction amplifier 9. The digital signals are converted to analog signals by the D/A converter 14, and are released to the external device as analog output signals $S_{out}$.

The following description will discuss recording and reproducing operations for additional information on and from the TOC area 23 in the magneto-optical disk 1.

In the TOC area 23, additional information including at least a program number of each music program recorded in the information recording area 24 and a recording start position and a recording end position of each music program according to the absolute addresses 22, is recorded by the optical head 3 and the magnetic coil 18 in the same manner as was aforementioned in recording in the information recording area 24. Furthermore, at the recording end position of the additional information located in the last part of the TOC area 23 is recorded a predetermined end mark.

Moreover, when the magneto-optical disk 1 is placed in the disk recording and reproducing device, as aforementioned, the contents of the TOC area 23 are read by the optical head 3 and stored in the TOC memory 11.

Figure 5:
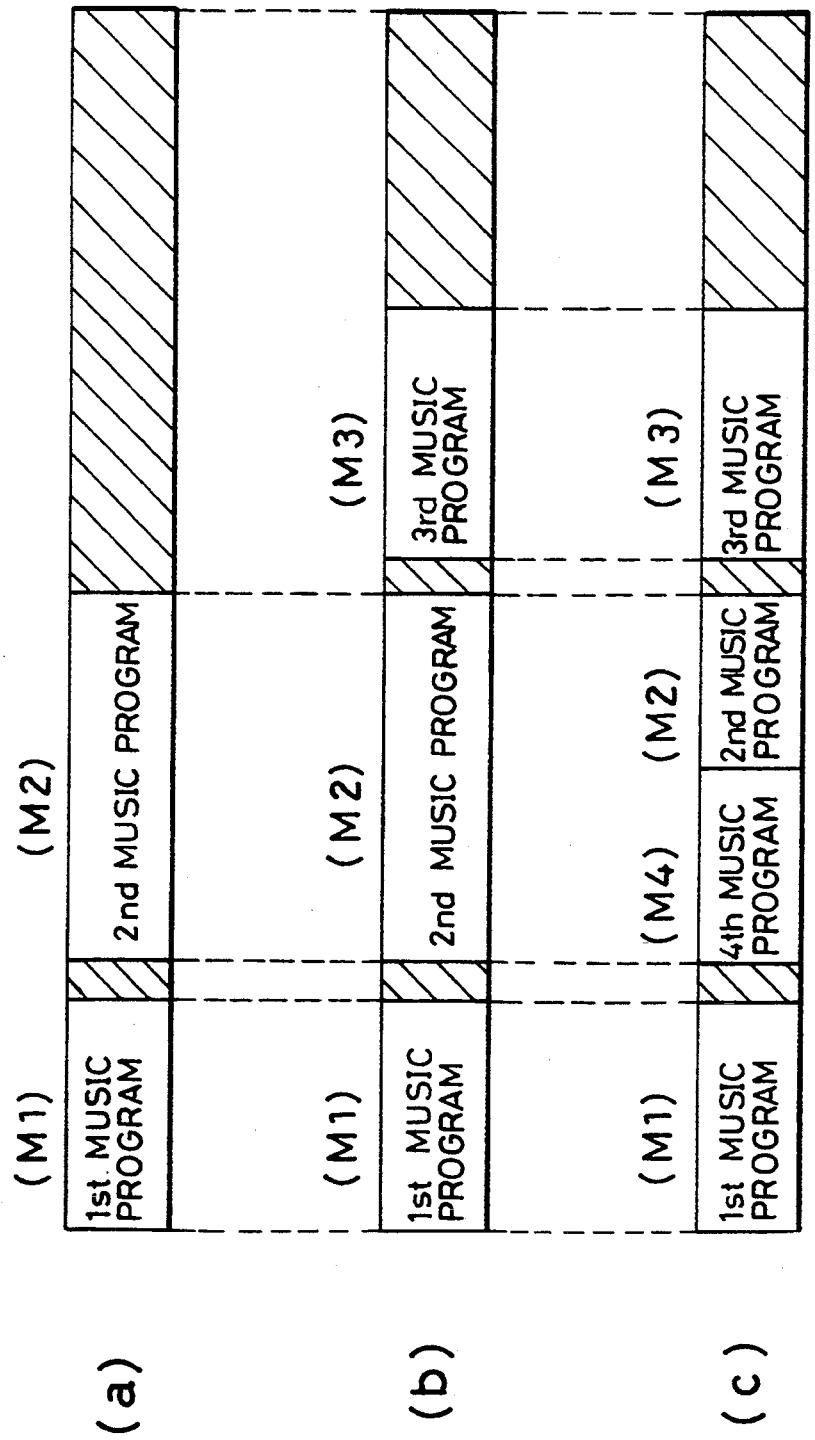

For example, as shown by (a) in FIG. 5, in the case where two music programs M1, M2 are recorded in the information recording area 24, the contents of the TOC area 23 are shown in Table 4.

TABLE 4

| Program No. | Recording Start Position | Recording End Position |
| --- | --- | --- |
| 01 | (00'00") | (03'54") |
| 02 | (03'57") | (08'15") |
| EE | (08'15") | — |

More specifically, as additional information with respect to the first and second music programs M1, M2, program numbers as well as recording start positions and recording end positions according to the absolute addresses 22 (shown as values corresponding to absolute time) are respectively recorded. Further, succeeding the recording end position of the additional information for the second music program, an end mark "EE" is recorded in the position where the program number of the third music program is supposed to be recorded. The end mark "EE" shows that the additional information with respect to the second music program M2 is the last additional information recorded in the TOC area 23. Moreover, in the place of the TOC area 23 where a value of the absolute address 22 indicating the recording start position of the third music program is supposed to be recorded, the same value of the absolute address 22 as that indicating the recording end position of the second music program is recorded. In addition, in the present embodiment, assuming that the number of music programs to be recorded in the information recording area 24 is 99 or less, program numbers "01" to "99" are allocated to the respective first to 99th music programs, and "EE" (hexadecimal) which is defined as a bigger number than the maximum number "99" is allocated as the end mark.

Next, as shown by (b) in FIG. 5, when the third music program M3 is newly recorded, succeeding the recording end position of the second music program M2 in the information recording area 24, the contents of the TOC area 23 are changed to those shown in Table 5.

TABLE 5

| Program No. | Recording Start Position | Recording End Position |
| --- | --- | --- |
| 01 | (00'03") | (03'54") |
| 02 | (03'57") | (08'15") |
| 03 | (08'18") | (12'25") |
| EE | (12'25") | — |

More specifically, on the end mark "EE" recorded in the position where the program number of the third music program is supposed to be recorded, by overwriting thereon, is recorded the program number "03" of the third music program, and further the recording start position as well as the recording end position of the newly recorded third music program M3 is recorded. Then, in order to show that the additional information with respect to the third music program M3 is the last additional information recorded within the TOC area 23, the end mark "EE" is recorded in the position where the program number of the fourth music program is supposed to be recorded.

Next, in a recording condition shown by (b) in FIG. 5, when a new music program M4 is recorded in the recording range of the second music program M2 in the information recording area 24 (see (c) in FIG. 5), only additional information with respect to the new music program M4 is added in the TOC area 23.

More specifically, as shown in Table 6, on the end mark "EE" recorded in the position where the program number of the fourth music program M4 is supposed to be recorded, by overwriting thereon, is recorded the program number "04" of the fourth music program M4, and further the recording start position as well as the recording end position of the fourth music program M4 is recorded. Further, an end mark "EE" is newly recorded in the position where the program number of the fifth music program is supposed to be recorded. Moreover, succeeding the end mark "EE", a value of the absolute address 22 indicating the furthest rear end position of the recorded range in the information recording area 24, that is, the recording end position of the music program M3, is recorded.

TABLE 6

| Program No. | Recording Start Position | Recording End Position |
| --- | --- | --- |
| 01 | (00'03") | (03'54") |
| 02 | (03'57") | (08'15") |
| 03 | (08'18") | (12'25") |
| 04 | (03'57") | (06'31") |
| EE | (12'25") | — |

As shown in the above, in the present embodiment, when a new music program is recorded in the information recording area 24, since only additional information with respect to the music program is successively added in the TOC area 23, the arrangement allows time required to record the additional information to be shortened. Further, in the arrangement, since the end mark "EE" is recorded in the furthest rear end of additional information, reproduction of the TOC area 23 can be completed upon reproducing the end mark "EE", and therefore reproducing time for TOC area 23 can be shortened by eliminating such inefficiency as to reproduce all the TOC area 23.

On the other hand, as shown by (c) in FIG. 5, in the case where another music program M4 is recorded in a recorded range in the information recording area 24 by overwriting thereon, two pieces of additional information with respect to the former music program M2 and to the new music program M4, both of which are recorded in the same range, are coexistent with each other in the TOC area 23. In that case, at the time when the contents of the TOC area 23 shown in Table 6 are read in order to be stored in the TOC memory 11, editing processing is performed thereon. When a plurality of music programs, for example, M2, M4 are recorded in the same range, with one positioned after the other in the TOC area 23, the piece of additional information with respect to the music program M4 which was lastly recorded, that is, the piece of additional information recorded in the further rear end of the TOC area 23, is defined as an effective piece of additional information, and consequently new pieces of additional information after the editing processing shown in Table 7 can be stored in the TOC memory 11. When the additional information with respect to each of the music programs is displayed on the display 12, the contents after the editing processing is preferably employed.

TABLE 7

| Program No. | Recording Start Position | Recording End Position |
| --- | --- | --- |
| 01 | (00'03") | (03'54") |
| 02 | (03'57") | (06'31") |
| 03 | (08'18") | (12'25") |
| EE | (12'25") | — |

Furthermore, in the case where pieces of additional information increase in number to flow over the capacity of the TOC area 23 by successively adding new pieces of additional information in the TOC area 23, or where the required reproducing time of the TOC area 23 reaches a predetermined required time, for example, a period of several seconds, the same editing processing for additional information as shown in the above can be performed, and the new contents after the editing processing can be recorded in the TOC area 23.

As aforementioned, a disk recording and reproducing device of the present invention comprises recording means, whereby information is recorded in the information recording area, and on the one hand, additional information with respect to the recorded information is recorded in the TOC area, and on the other hand, an end mark is recorded in the rear end part of the additional information in the TOC area; and when a new piece of information is recorded in the information recording area, additional information with respect to the new piece of information is overwritten to add onto the end mark already recorded in the TOC area, and an end mark is newly recorded in the rear end part of the additional information overwritten to add thereto.

By the arrangement, since the end mark is recorded upon finishing the recording of additional information to the TOC area, the reproduction of the TOC area is completed upon reproducing the end mark. Consequently, such inefficiency as to reproduce all the TOC area is eliminated, and required reproducing time for the TOC area is shortened.

Moreover, when a new piece of information is overwritten in the information recording area having information already recorded, additional information with respect to the piece of information newly recorded is overwritten to add onto the end mark, if necessary, and an end mark is newly recorded in the rear end part of the additional information. In the other words, since only the additional information with respect to the newly recorded information is recorded to add in the TOC area, the need for rewriting the additional information already recorded is eliminated, and therefore required rewriting time for the TOC area is shortened.

The following description will discuss another embodiment of the present invention referring to FIGS. 1, 2, 6 and 7.

In the present embodiment, the same magneto-optical disk 1 in the aforementioned embodiment is used as a re-writable disk, and the device is designed to record and reproduce information by the use of data formats standardized in conventional CD's.

Figure 6:
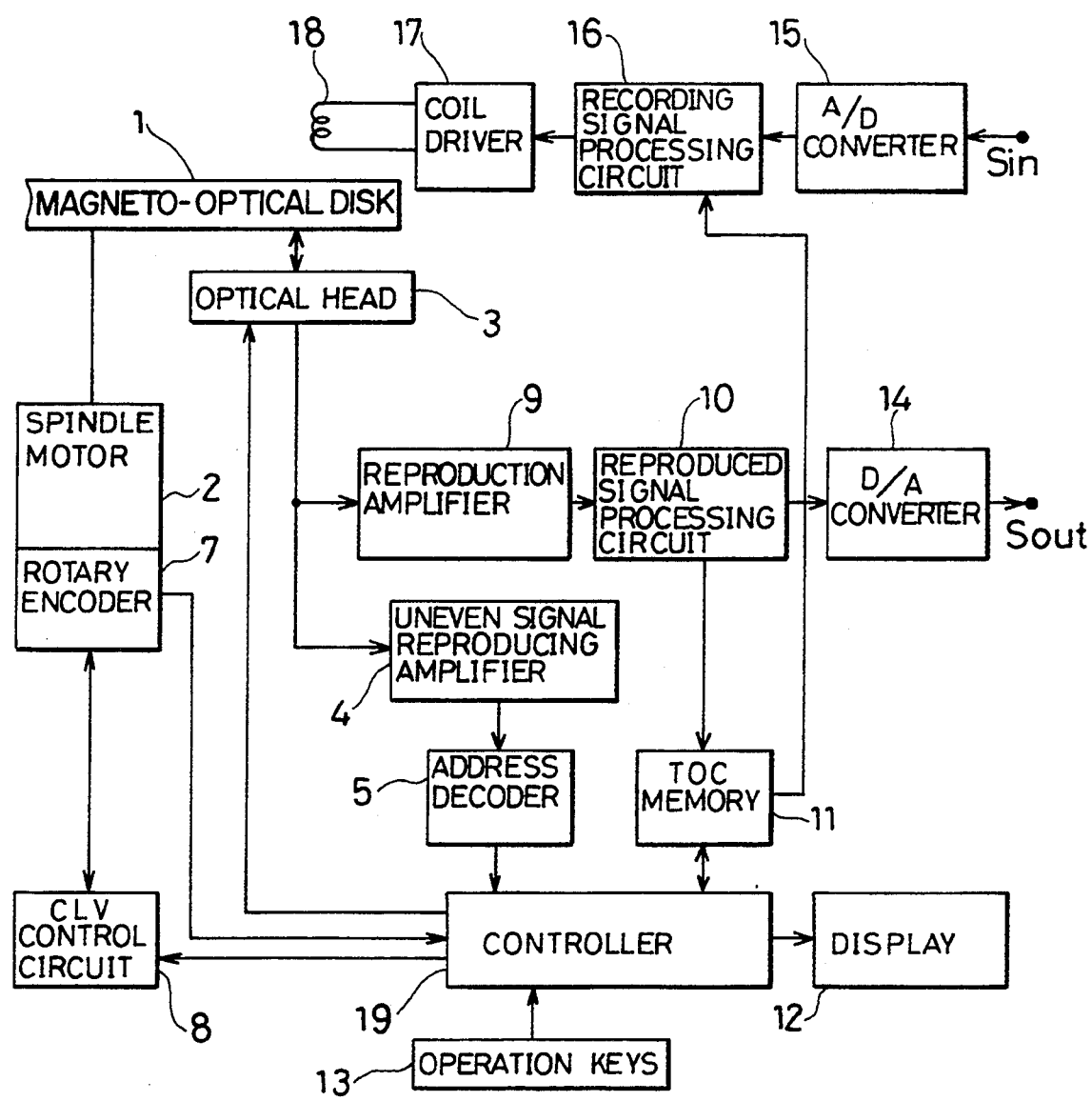
FIGS. 6 and 7 show another embodiment of the present invention.

The disk recording and reproducing device of the present embodiment has the same arrangement as that shown in FIG. 1 except that it employs a controller 19 shown in FIG. 6 instead of the controller 6 shown in FIG. 1. Therefore, those of the members having the same functions and described in FIG. 1 are indicated by the same reference numerals and the description thereof is omitted.

In the TOC area 23 on the magneto-optical disk 1 shown in FIG. 2, there are recorded a defective part start position and a defective part end position as additional information in addition to the program number, the recording start position and recording end position, with respect to each piece of music information recorded in the information recording area 24.

As shown in FIG. 6, a controller 19 not only controls the whole disk recording and reproducing device, but also has functions as control means and as defective part recognition means, which will be described later. A display 12 connected to the controller 19 is designed to display program numbers, time information and further defective part information according to the contents of a TOC memory 11 (memory means) wherein the contents of the TOC area 23 are stored. Moreover, a group of operation keys 13 is connected to the controller 19, and the user can give various instructions, for example, defective part instruction and the like through the operation keys 13.

The controller 19, on the other hand, functions as control means for controlling to inhibit the device from writing or reading in or from a defective area when an instruction is given by the user so as to write or read in or from the defective area in his recording or reproducing instruction. As one of the methods for restraining recording or reproducing operation, such a method is suggested, wherein while driving of an optical head 3 is stopped, the control operation, which has proceeded to a routine for recording information or for reproducing information, is returned to a routine for waiting for key input in the controller 19.

Furthermore, the controller 19 also functions as defective part recognition means for recognizing defective parts with respect to the magneto-optical disk 1.

More specifically, it is possible for the controller 19 to recognize defective parts by accepting defective part information entered by the user as it is. For example, either method is suggested, wherein absolute address values indicating the start and the end of a defective part are entered, or wherein a range corresponding to a defective part is given in millimeter, and the input value is converted to the corresponding absolute address value in the controller 19. Of course, it is possible for the controller 19 itself to recognize defective parts after judging the positions thereof. As an example of the judgement made by the controller 19 itself, one of such methods is proposed, wherein it is judged whether absolute addresses being successively read in recording or reproduction are incrementing/decrementing in a regular order, and if they are not incrementing/decrementing in the regular order, it is judged that a track-jump or the like has occurred, and the corresponding absolute address is decided as that showing the start position of a defective part. As to deciding the end position of the defective part, for example, a successive reproduction is resumed at a position located five seconds after the aforementioned start position of the defective part, and if nothing is wrong with the reproduction, the absolute address corresponding to the resumed position is decided as the end position of the defective part. If the defective part is continuously detected in the reproduction, another successive reproduction is resumed at a position five seconds after the aforementioned resumed position, and thereinafter the same operation is repeated until the end position of the defective part is detected.

Moreover, according to absolute addresses being read during recording or reproduction of music programs, the controller 19 judges where defective parts are, and releases the defective part information to the TOC memory 11, where it is stored. As aforementioned, decision on defective parts is made by the controller 19.

The contents of the TOC memory 11 are recorded in the TOC area 23 as additional information, for example, when the magneto-optical disk 1 is removed from a spindle motor 2, or when the user specifies the necessity of the recording through the operation keys 13. In that case, the optical head 3 and a magnetic coil 18 function as recording means. Accordingly, even if the magneto-optical disk 1 is removed from the disk recording and reproducing device, the defective part information is maintained in the magneto-optical disk 1. Moreover, when the magneto-optical disk 1 is used in the following occasion, the defective part information is read from the TOC area 23, and is stored in the TOC memory 11, and according to the contents, inhibition control for recording or reproduction is performed. Further, if other defective parts are detected in this occasion, the information is once stored in the TOC memory 11, and then is transferred to the TOC area 23, and therefore the defective part information in the TOC area 23 is updated.

Next, the following description will discuss reproducing operation in the TOC area 23. The contents of the TOC area 23 show, for example, program numbers for music programs or the like recorded in the information recording area 24, defective part start positions and defective part end positions for defective parts and the like, all of which are indicated by the corresponding absolute addresses 22. When the magneto-optical disk 1 is placed on the spindle motor 2, the controller 19 on the one hand shifts the optical head 3 to the TOC area 23, and on the other hand rotates the magneto-optical disk 1 at a predetermined linear velocity to reproduce the contents of the TOC area 23, and when there are some pieces of information recorded in the TOC area 23, it permits the TOC memory 11 to store those pieces of information therein. Here, for example, it is assumed that the contents already recorded in the TOC area 23 are shown in the following Table 8.

TABLE 8

| Area No. | Defective Part Start Position | Defective Part End Position |
| --- | --- | --- |
| 01 | (35'00") | (37'30") |
| 02 | (45'00") | (50'00") |

According to the contents shown in Table 8 stored in the TOC memory 11, the controller 19 performs inhibition control so as not to record or reproduce in or from sections specified as defective areas, (35'00") to (37'30") and (45'00") to (50'00"), in recording or reproducing music programs.

The inhibition control is performed by the aforementioned method, wherein while driving of the optical head 3 is stopped, the control operation, which has proceeded to a routine for recording information or for reproducing information, is returned to a routine for waiting for key input in the controller 19.

With the above arrangement, in a disk containing a defective part therein, only the use of the defective part thereof is eliminated, and other available parts thereof are effectively used, and therefore although the abandonment of the disk was necessary only because it had a defective part in a section thereof, such wasteful use of disks is avoidable.

Further, since the defective part information is recorded in the TOC area 23 of the disk, it is not necessary for the user to make a note so as to recognize where the defective part is, and the disk recording and reproducing device itself can take a proper measure by obtaining the defective part information before the recording or reproduction of music information without giving the trouble to the user.

Figure 7:
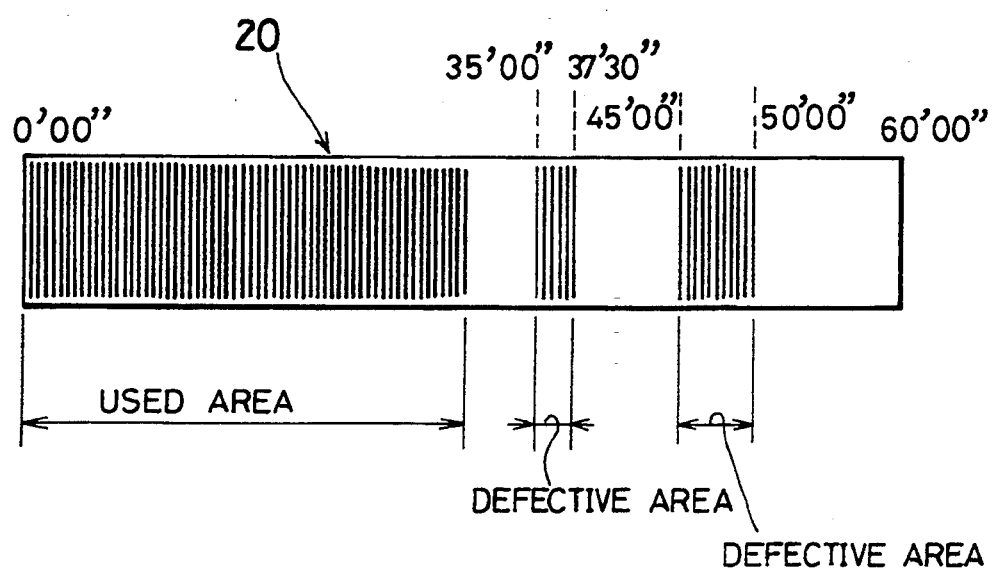

In addition, instead of displaying absolute addresses corresponding to defective parts in the display 12, as shown in FIG. 7, it is possible to use display means 20 having ranges capable of respectively lighting on in the form of bars. In that case, the defective parts can be indicated as analog display on the display means 20 by forming bright and dark areas respectively corresponding to defective ranges and used ranges in the same displaying manner, and thus the user can recognize writable areas (writable capacity and writable positions) clearly and promptly.

Furthermore, as to methods to judge defective parts, besides the aforementioned method utilizing abnormal condition of servo system such as track-jump or the like, such methods are suggested wherein the decision is made by utilizing the number of errors during reproduction which have exceeded a possible correction range, or by monitoring an abnormal condition of reproduced signal amplitude.

As aforementioned, a disk recording and reproducing device of the present invention comprises: defective part recognition means for recognizing defective parts of the disk; memory means for storing defective part information from the defective part recognition means; recording means for recording in the TOC area the contents stored in the memory means as additional information; and control means for inhibiting the reproduction and recording of information in the defective parts according to the defective part information.

With the above arrangement, such wasteful use of disks as to abandon a disk only because it has a defective part in a section thereof, is avoidable. Moreover, it is not necessary for the user to make a note so as to recognize where the defective part is, and the disk recording and reproducing device itself can take a proper measure by obtaining the defective part information before the recording or reproduction of music information without giving the trouble to the user.

Figure 8:
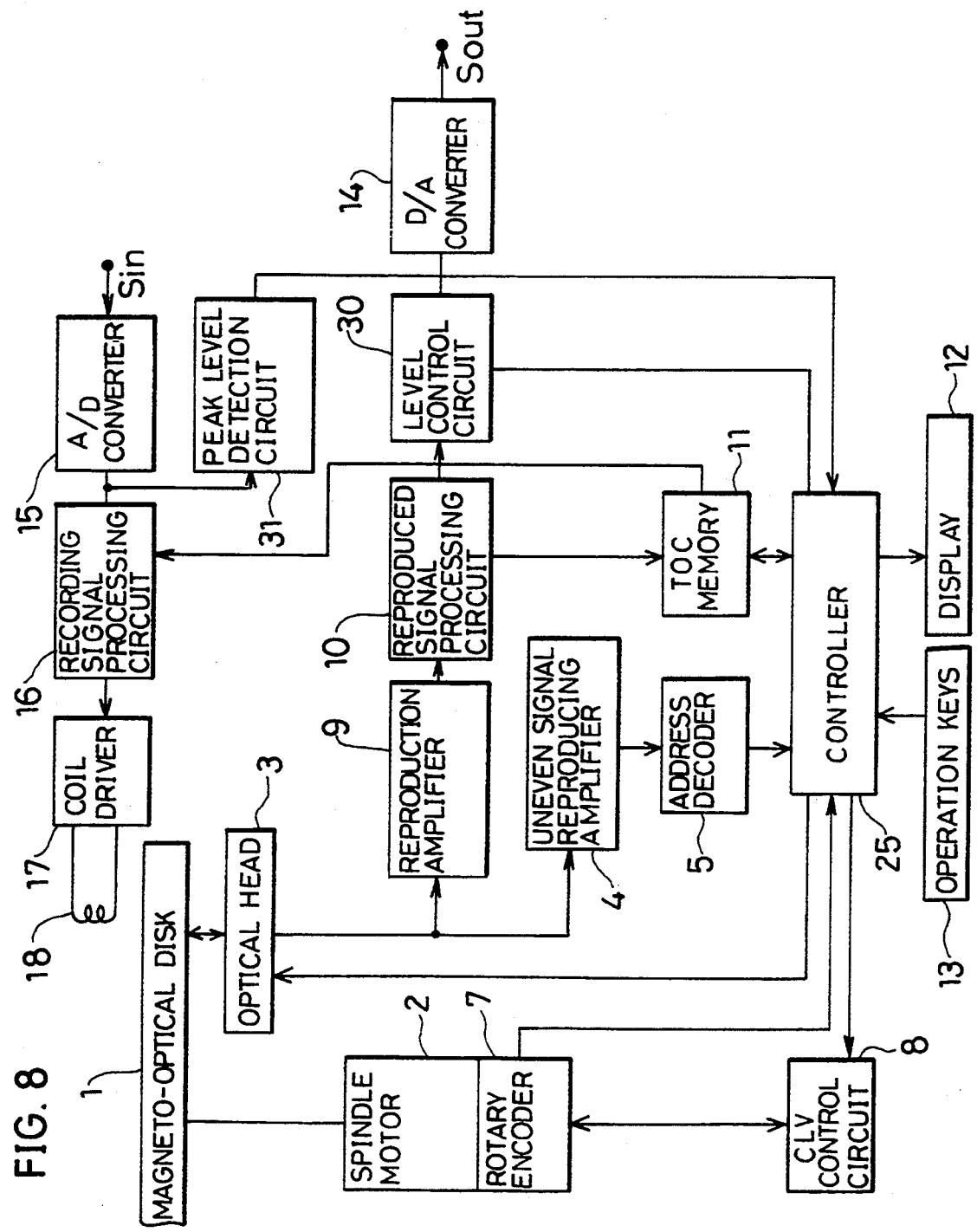
FIGS. 8 to 10 show another embodiment of the present invention.

The following description will discuss another embodiment of the present invention referring to FIGS. 2 and 8.

In the present embodiment, the same magneto-optical disk 1 in the aforementioned embodiment is used as a re-writable disk, and the device is designed to record and reproduce information by the use of data formats standardized in conventional CD's.

Moreover, those of members having the same functions and described in the aforementioned embodiment are indicated by the same reference numerals and the description thereof is omitted.

FIG. 8 shows a disk recording and reproducing device for recording and reproducing on and from the magneto-optical disk 1.

A controller 25 is designed to control the whole mechanism of the disk recording and reproducing device.

In a TOC memory (memory means) 11, among signals processed in a reproduced signal processing circuit 10, those of the signals indicating the contents of the TOC area 23 (see FIG. 2) are stored, and information specified by the user (instructions through operation keys 13, which will be described later) as well as peak level information stored in the controller 25 including peak level value information and peak level generation positional information and the like is also stored.

There is a level control circuit 30 connected to the reproduced signal processing circuit 10. The level control circuit 30 controls the level of reproduced signals released from the reproduced signal processing circuit 10, according to level setting information released from the controller 25. More concretely, since the signals from the reproduced signal processing circuit 10 are released as digital signals, a predetermined operation processing is applied to those digital signals before being released. There is a D/A converter 14 connected to the level control circuit 30, and by the use of the D/A converter 14, the digital signals coming through the level control circuit 30 are converted to analog signals, and then are released to the external device as analog signals $S_{out}$.

Moreover, in the case of recording music programs from other sources, analog signals $S_{in}$ for the music program from the external device are converted to digital signals by a A/D converter 15, and then are also entered to a peak level detection circuit 31. The peak level detection circuit 31 detects a peak level value of the music program in digital format, and releases the value to the controller 25. The controller 25, then judges the position of an absolute address indicating the time at which the peak level value information from the peak level detection circuit 31 is entered thereto, that is to say, judges a peak level generation position. The judgement of the peak level generation position can be performed by monitoring elapsed time while recording a music program, or by other methods.

As described above, in recording music programs from other sources, peak level value information and peak level generation positional information of each music program are respectively detected by the peak level detection circuit 31 and the controller 25, and those two pieces of information are stored in the TOC memory 11, and further the contents of the TOC memory 11 are recorded in the TOC area 23 on the disk 1. In that case, a magnetic coil 18 and an optical head 3 function as recording means.

The contents of the TOC memory 11 are recorded in the TOC area 23 as additional information, for example, when the magneto-optical disk 1 is removed from a spindle motor 2, or when the instruction is given by the user through the operation keys 13 as he judges the necessity thereof. Accordingly, the above peak level information is maintained in the magneto-optical disk 1, even if the disk 1 is removed from the disk recording and reproducing device. Further, when the magneto-optical disk 1 is placed in the disk recording and reproducing device in the next occasion, the peak level information is read from the TOC area 23, and stored in the TOC memory 11, and therefore recording control according to the contents thereof is performed.

On the other hand, in reproducing music programs recorded in the information recording area 24 (see FIG. 2), polarizing components whose plane of polarization is rotating in accordance with the direction of magnetization on the magneto-optical disk 1, are detected by the optical head 3, and are converted to a digital music program by the reproduced signal processing circuit 10 after being amplified by a reproduction amplifier 9. After passing through the level control circuit 30, the digital signals are converted to analog signals by the D/A converter 14, and are released to the external device as analog output signals $S_{out}$.

The following description will discuss the reproducing operation of additional information recorded in the TOC area 23. The contents of the TOC area 23 include, for example, the program number, recording start position and recording end position, and further the aforementioned peak level value information as well as the peak level generation positional information, with respect to each of music programs recorded in the information recording area 24. When the magneto-optical disk 1 is placed on the spindle motor 2, the controller 25 on the one hand shifts the optical head 3 to the TOC area 23, and on the other hand rotates the magneto-optical disk 1 at a predetermined linear velocity to reproduce the contents of the TOC area 23. When there are some pieces of additional information recorded in the TOC area 23, those pieces of information are stored in the TOC memory 11. Here, for example, it is assumed that the contents already recorded in the TOC area 23 are shown in the following Table 9, where the peak level value is expressed in hexadecimal using complement number of two.

TABLE 9

| Program No. | Peak Level Generation Position | Peak Level Value |
|---|---|---|
| 01 | (03'47") | 7AE8 |
| 02 | (08'16") | 6B91 |
| 03 | (12'20") | 7BC2 |

Referring to the above additional information, the following description will discuss the copying operation of music programs from the disk recording and reproducing device to the external recording device.

For example, when the user wants to copy the first music program, by the instruction through the operation keys 13, the controller 25 permits the reproducing operation to start with respect to the first music program in the magneto-optical disk 1 upon receiving the instruction. The reproduced signals, as aforementioned, are converted to digital data by the reproduced signal processing circuit 10, and after passing through the level control circuit 30, are released from the D/A converter 14 as analog signal $S_{out}$ to the external device.

Here, the controller 25 has recognized that the peak level value of the first music program is 7AE8 in hexadecimal, and predeterminately sets level adjusting amount for use in the level control circuit 30 according to the value, and then releases the setting information to the level control circuit 30. In the level control circuit 30, operation processing is applied to the digital data according to the level setting information entered from the controller 25, thereby properly adjusting the reproducing level of the music program automatically.

Therefore, since the music program whose reproducing level is properly adjusted is entered to the external recording device, it is not necessary for the user to perform the troublesome level setting by himself, and preferable copying operation to the external recording device is readily executed.

In addition, the detection of peak level can be performed at a step before the A/D converter 15, and further the level control circuit 30 can be installed at a step after the D/A converter 14. In other words, in the copying operation for music programs, the level adjustment is performed regardless of analog signals or digital signals.

Moreover, in the present embodiment, when music programs are recorded in the disk recording and reproducing device from a predetermined external source, the peak level thereof is detected, and the peak level information is once stored in the TOC memory Therefore, after the music programs from the predetermined external source have been recorded, the above-mentioned operation may be performed at the time when the music programs are reproduced. More specifically, with respect to music programs recorded in the magneto-optical disk 1, editing operations such as numbering the music programs etc. are performed while reproducing them, and the results of the editing operations may be recorded in the TOC area 23. In that case, the peak level of each music program is detected during those editing operations, and the peak level information may be stored in the TOC memory 11.

Figure 9:
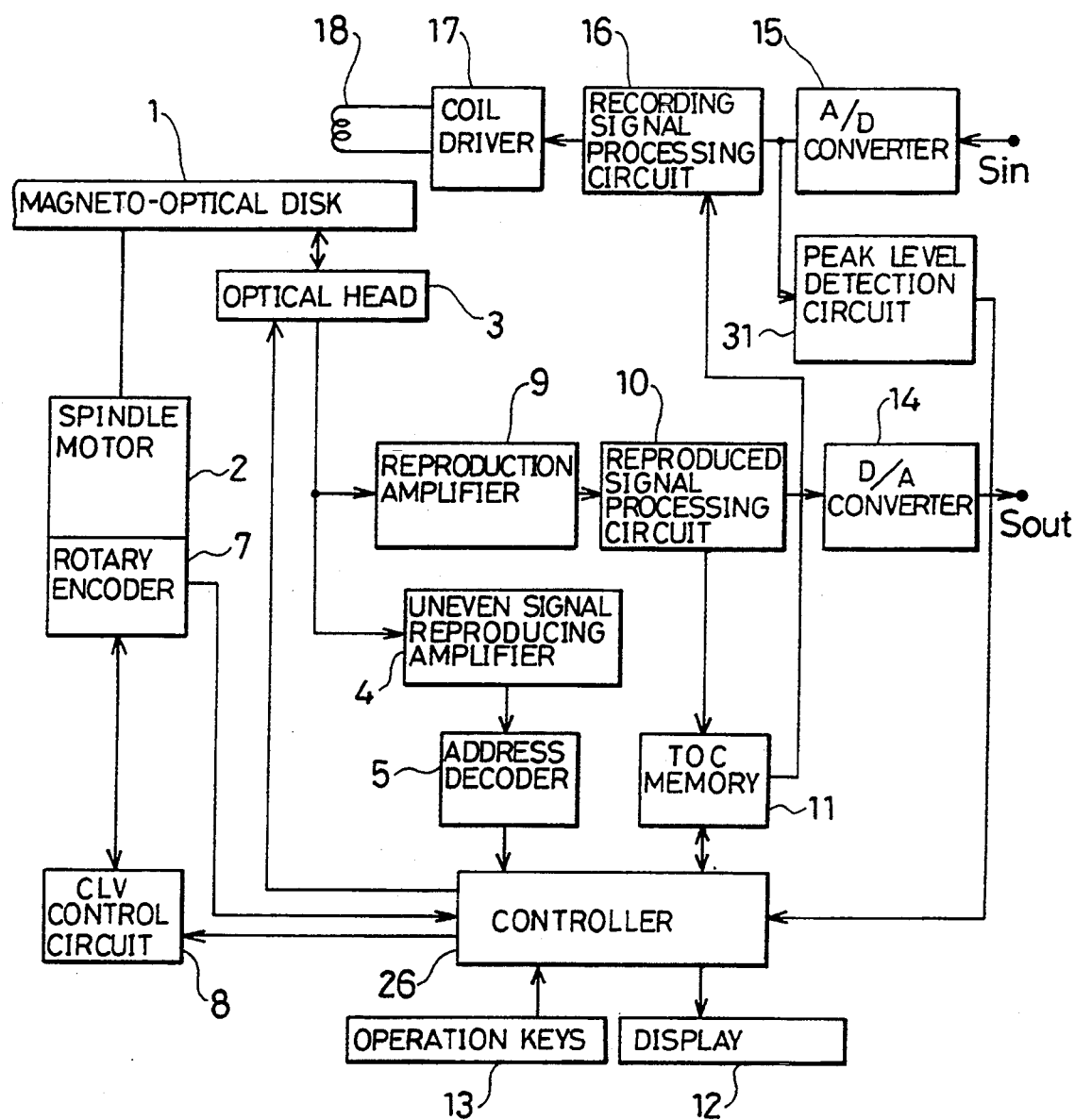

The following description will discuss a modified example of the present embodiment referring to FIG. 9.

A disk recording and reproducing device in this embodiment has an arrangement wherein the level control circuit 30 is omitted from that shown in FIG. 8.

As shown in FIG. 9, in a circuit configuration of the disk recording and reproducing device of the present embodiment, there is installed a controller 26 instead of the controller 25 shown in FIG. 8. The controller 26 is designed to control the device such that a peak level part and a vicinity thereof of a music program can be reproduced repeatedly by the use of peak level generation positional information.

With the arrangement, by repeatedly reproducing the peak level part and the vicinity thereof, and by entering those reproduced signals to an external recording device prior to the actual recording operation of the music program, the user can set a reproducing or recording level while monitoring a level meter installed in the external recording device. In that case, as aforementioned, by obtaining the peak level repeatedly, which normally appears only in an instant, the setting of reproducing or recording level is performed easily and promptly.

Figure 10:
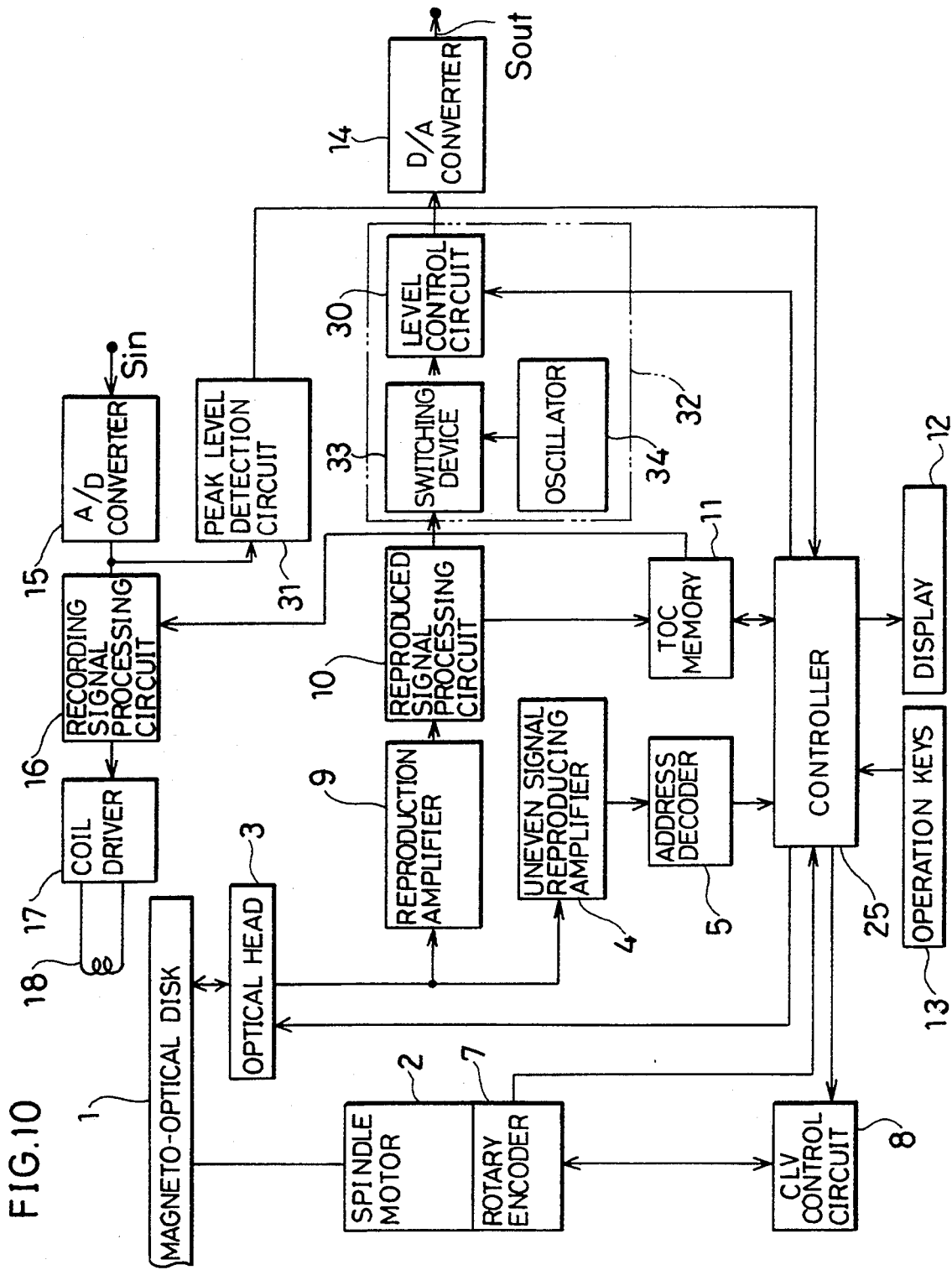

The following description will discuss another modified example of the above-mentioned embodiment referring to FIG. 10.

As shown in FIG. 10, in this embodiment, there is disposed a reference signal generating section 32 between a reproduced signal processing circuit 10 and a D/A converter 14. The reference signal generating section 32 comprises a level control circuit 30, a switching device 33 for switching a signal output in normal reproduction to a reference signal output interchangeably and an oscillator 34 for releasing a constant level sinusoidal signal and the like, and has a circuit configuration wherein the switching device 33 and the oscillator 34 are added to the circuit configuration shown in FIG. 8.

As shown in FIG. 10, the controller 25 has recognized the peak level value of a music program, and predeterminately sets level adjusting amount for use in the level control circuit 30 according to the value, and then releases the setting information to the level control circuit 30. The level control circuit 30, according to the level setting information entered from the controller 25, performs a level adjusting operation on a constant level sinusoidal signal released from the oscillator 34 so that the peak level thereof can be equivalent to the peak level of the level setting information. The reference signal produced through the above adjusting operation is released through the D/A converter 14 to an external device.

The above reference signal is released to the external recording device prior to the actual recording operation of the music program, and thus the user can set the reproducing level of the disk recording and reproducing device and the recording level of the external recording device while monitoring a level meter installed in the external recording device. In that case, since the level setting is performed by the use of not the peak level which appears only in an instant, but the reference signal which is successively released, the setting of reproducing or recording level is performed easily and promptly.

As aforementioned, the disk recording and reproducing device of the present invention comprises the peak level detection circuit for detecting peak levels of music information, memory means for storing therein peak level information with respect to the peak levels and recording means for recording the contents stored in the memory means in the TOC area as additional information.

Thus, preferable copying operation is readily performed from the disk recording and reproducing device to the external device.

Figure 11:
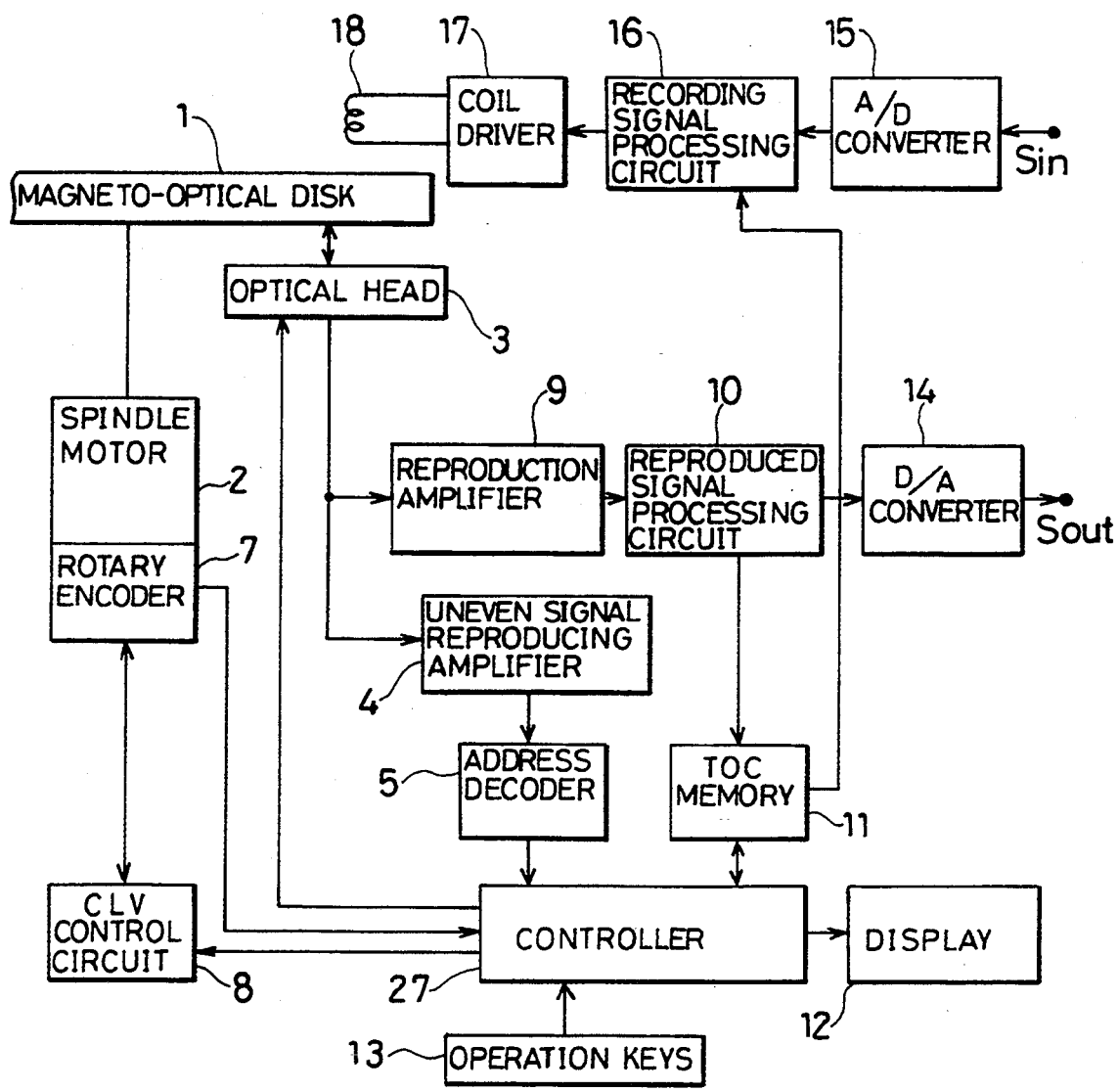
FIGS. 11 and 12 show another embodiment of the present invention.
Figure 12:
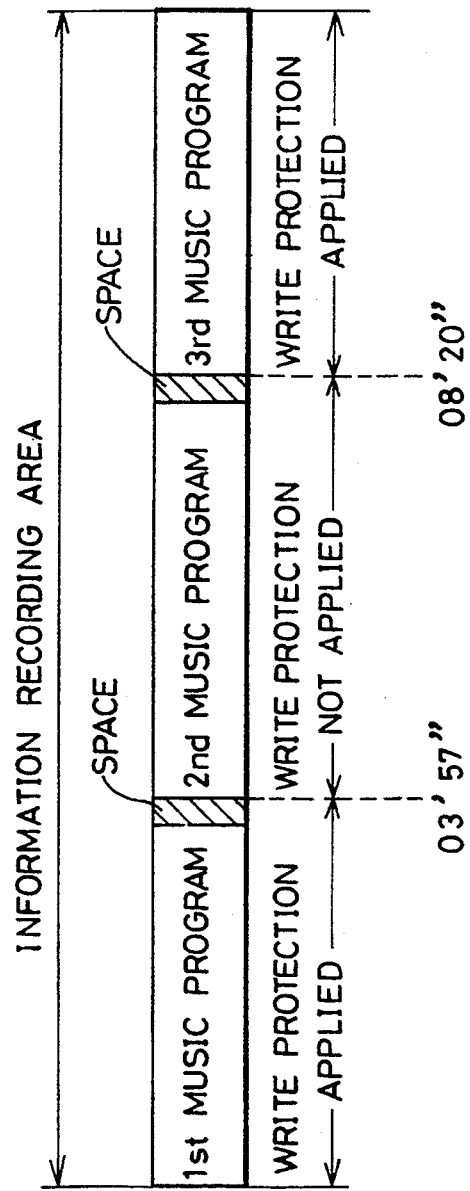

The following description will discuss still another embodiment of the present invention referring to FIGS. 2, 11 and 12.

In the present embodiment, the same magneto-optical disk 1 in the aforementioned embodiment is used as a re-writable disk, and the device is designed to record and reproduce information by the use of data formats standardized in conventional CD's.

The disk recording and reproducing device of the present embodiment has the same arrangement as that shown in FIG. 1 except that a controller 27 is used therein instead of the controller 6 in FIG. 1.

Therefore, those of members having the same functions as those shown in FIG. 1 are indicated by the same reference numerals and the description thereof is omitted.

As shown in FIG. 11, the controller 27 not only controls the whole mechanisms of the disk recording and reproducing device, but also functions as control means, which will be described later. Moreover, a display 12 is connected to the controller 27, and the display 12 displays thereon a program number, time information and write protection information with respect to each of the music programs, according to the contents of a TOC memory 11 (memory means).

The controller 27 also functions as control means for controlling to restrain the device from writing in a write protection range when an instruction is given by the user so as to write in the write protection range in his information recording instruction. As one of the methods to restrain recording operation, such a method is suggested, wherein while driving of an optical head 3 (application of light beam required for recording) is stopped, the control operation, which has proceeded to a routine for recording information information, is returned to a routine for waiting for key input in the controller 27.

Next, the following description will discuss reproducing operation in the TOC area 23 (see FIG. 2). The recorded contents of the TOC area 23 include, for example, the program number, the recording start position and recording end position and the like recorded therein according to the absolute addresses 22, with respect to each of the music programs or the like recorded in the information recording area 24 (see FIG. 2).

When the magneto-optical disk 1 is placed on a spindle motor 2, the controller 27 on the one hand shifts the optical head 3 to the TOC area 23, and on the other hand rotates the magneto-optical disk 1 at a predetermined linear velocity to reproduce the contents of the TOC area 23. When there are some pieces of information recorded in the TOC area 23, it permits the TOC memory to store those pieces of information therein. Here, for example, it is assumed that the contents already recorded in the TOC area 23 are shown in the following Table 10.

TABLE 10

| Program No. | Recording Start Position | Recording End Position |
|---|---|---|
| 01 | (00′03″) | (03′54″) |
| 02 | (03′57″) | (08′15″) |
| 03 | (08′20″) | (12′43″) |

The recording start position and recording end position of each corresponding program number correspond to the time information given by the absolute addresses 22, and are read from the TOC area 23 and stored in the TOC memory 11. The controller 27 permits the display 12 to display thereon the above contents of the TOC memory 11. The user can recognize the contents of the music programs or the like recorded in the disk 1 by the above-mentioned contents displayed, and if he wants to listen to, for example, the second music program, he gives an instruction to do so through operation keys 13. Upon receiving the instruction, the controller 27 makes the optical head 3 access to an absolute address position showing (03'57") in FIG. 10, thereby permitting the selection of the music program. Moreover, in reproducing music programs, depending on the contents of the TOC memory 11, besides the program numbers, relative time (elapsed time) for each program is displayed on the display 12 by the use of a value obtained by subtracting the recording start time from the value of each absolute address 22 being successively read, with the recording start position as the origin of the counting. Of course, it is possible to display each absolute address 22 being successively read as absolute address time. Thus, by using the contents of the TOC area 23 and the absolute addresses 22 being successively read, useful display functions are obtained without a particular need for subcode information of the information recording area 24.

Next, the following description will discuss the operation for applying write protection to each of the music programs. As with the aforementioned operation, the user recognizes the contents of the music programs or the like recorded in the disk by the above-mentioned contents displayed, and when he wants to apply write protection, for example, to the first and the third music programs, as shown in FIG. 12, he gives an instruction to do so through the operation keys 13. Upon receiving the instruction, the controller 27 stores the write protection information in the TOC memory 11. In addition, as shown in the figure, simultaneously as the instruction is given to a music program, the write protection may be also given to a space between music programs, disposed after the end of the music program to which write protection is given.

The contents of the TOC memory 11 are recorded in the TOC area 23 as additional information, for example, when the magneto-optical disk 1 is removed from the spindle motor 2, or when the user specifies the necessity of the recording through the operation keys 13. Accordingly, even if the magneto-optical disk 1 is removed from the disk recording and reproducing device, the write protection information is maintained in the magneto-optical disk 1. When the magneto-optical disk 1 is placed in the next occasion, the write protection information is read from the TOC area 23 and stored in the TOC memory 11, and recording control is performed according to the contents. Further, the write protection information once entered is effective unless it is updated, and therefore the write protection is executed with respect to the first and third music programs every time recording is made on the magneto-optical disk 1. In addition, the optical head 3 and a magnetic coil 18 function as recording means for recording in the TOC area 23 the contents stored in the TOC memory 11 as additional information.

Thus, since the write protection can be applied to each music program (information) independently, erasing operation, rewriting operation or the like only for unnecessary information can be performed with necessary information remaining recorded, and therefore advantages of re-writable disk are fully exhibited.

In addition to the write protection for each music program, various kinds of setting for write protection are suggested. For example, it is possible for the user himself to enter time information directly in order to apply write protection only to a part of the music programs. Furthermore, in the aforementioned example, in the case of receiving an instruction to record on the range having the first or third music program, while executing the write protection to the instruction, it is proposed that warning sound may be generated, besides display indicating that the range is under the operation of write protection.

As aforementioned, the disk recording and reproducing device of the present invention comprises the operation keys which are operable by the user, the memory means for storing therein write protection information to each of desired pieces of information entered through the operation keys, the recording means for recording in the TOC area the contents stored in the memory means as additional information and control means for restraining writing operation in the write protection range.

Thus, functions such as erasing operation or rewriting operation only for unnecessary information are available with necessary information remaining recorded, and consequently the advantages of re-writable disk are fully exhibited.

Figure 13:
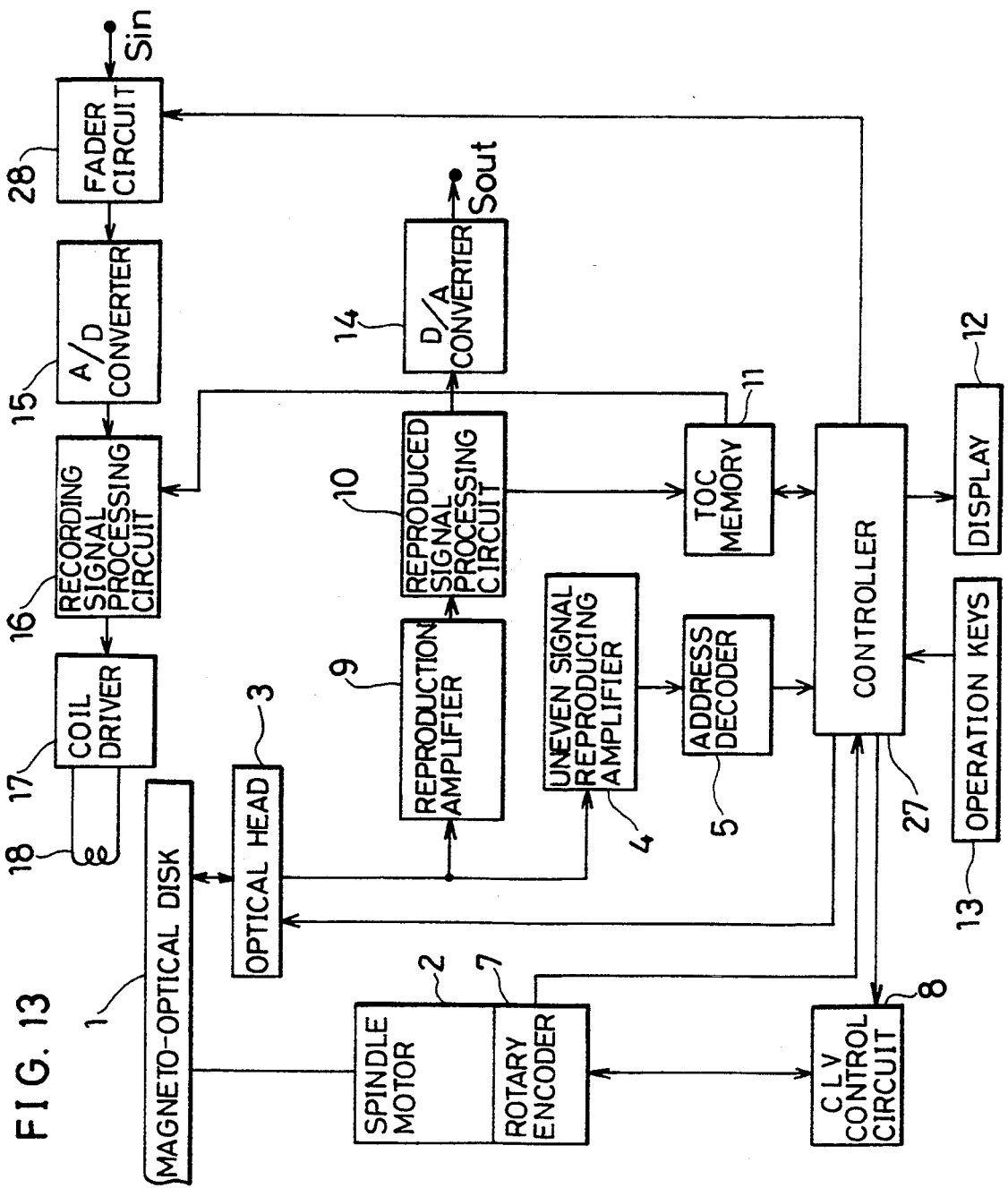
FIGS. 13 and 14 show another embodiment of the present invention..
Figure 14:
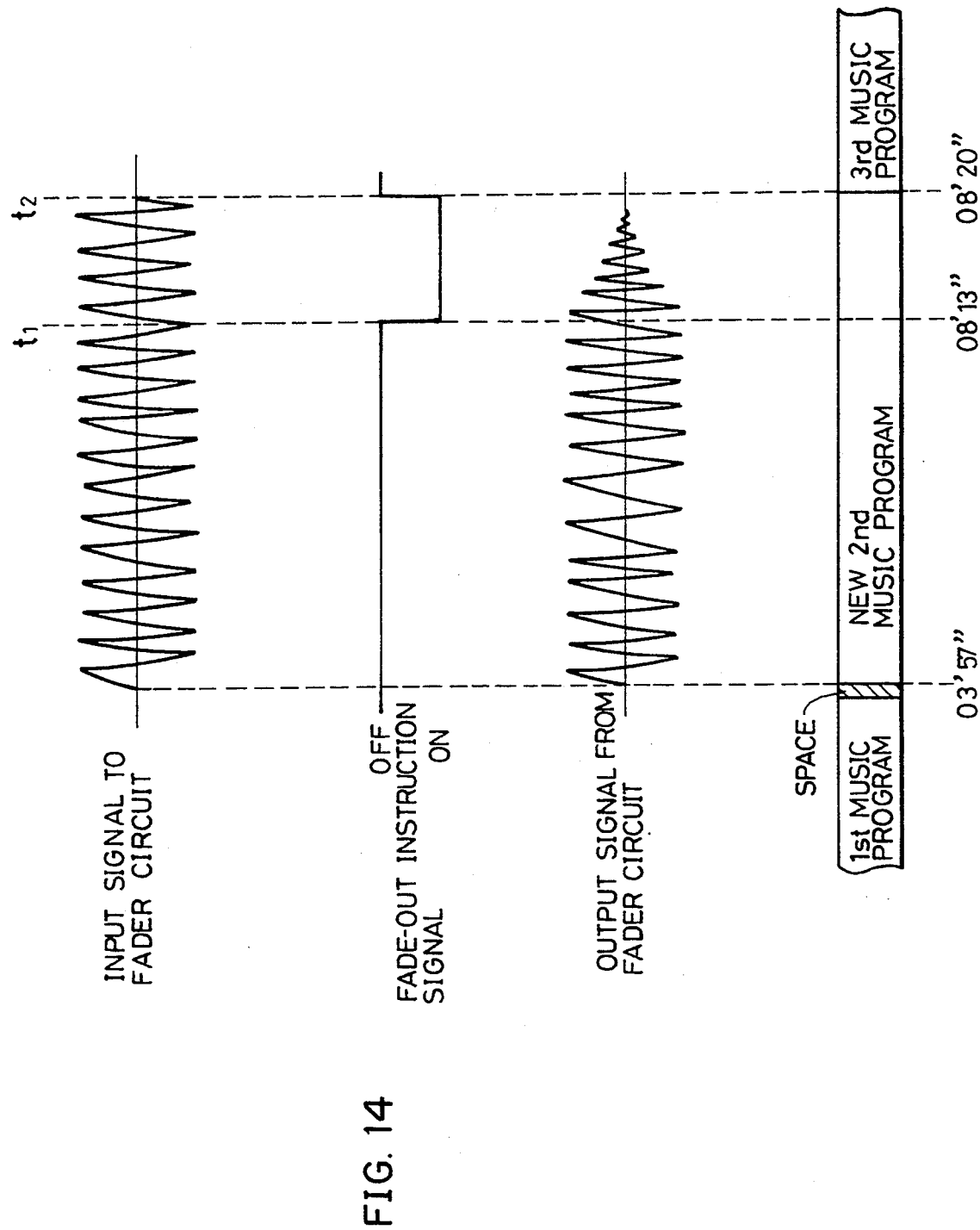

The following description will discuss another embodiment of the present invention referring FIGS. 13 and 14.

As shown in FIG. 13, in a disk recording and reproducing device of the present embodiment, there is configured a fader circuit 28 before an A/D converter 15 in addition to the arrangement shown in FIG. 11. A controller 27 is connected to the fader circuit 28. Music programs (music information) as analog signals are entered to the fader circuit 28, where fade-out processing is applied to the music programs according to the instruction of the controller 27, and the processed music programs are entered to the A/D converter 15. The controller 27 also give instructions to the fader circuit 28 about the timing when to apply the fade-out processing according to the information of the TOC memory 11 (information read from the TOC area 23, as shown in FIG. 2).

In the case where write protection is applied to the first and third music programs including spaces located after the respective music programs, the time corresponding to the non-write-protection area (writable area) is from (03'57") to (08'20"), that is to say, there is a writable range of 4 min. 23 sec. When a music program requiring more than 4 min. 23 sec. is recorded in the writable range, since the recording of the music program is finished halfway, a fade-out operation is applied thereto according to predetermined timing. For example, as shown in FIG. 14, in the case of write protection starting from $(08'20'')(t_2)$, the fade-out operation is applied to the music program at the time $(08'13'')(t_1)$ which is seven seconds before the write protection start time (08'20") by a method such as monitoring the elapsed time of the music program during its recording operation.

In addition, it is proposed that the fade-out operation is preset so as to become soundless at the time three seconds before the end within the seven seconds, and during the three seconds, a soundless condition is maintained, thereby forming a three second space between the newly recorded second music program and the third music program. Further, in the present embodiment, the fade-out processing is applied to music programs entered as analog signals; however, when music programs are entered as digital signals, the fade-out processing can be applied to the digital signals as they are.

With the above arrangement, when the newly recorded second music program is reproduced, the sound becomes gradually fading out before the end of the music program, and therefore, since the music program is completed without giving the impression of having a missing part at the end, it is avoidable to give unpleasant feeling to the listener.

The disk recording and reproducing device of the present invention comprises the operation keys which are operable by the user, the memory means for storing therein write protection information to each of desired pieces of information entered through the operation keys, the recording means for recording in the TOC area the contents stored in the memory means as additional information, the control means for restraining writing operation in a write protection range and a fader circuit for applying the fade-out processing to the information before the end of a non-write-protection range when information is recorded in the non-write-protection range and, at least, the capacity of the information to be recorded is greater than that of the non-write-protection range.

Therefore, when the recorded information is a music program and it is reproduced, the sound becomes gradually fading out before the end of the music program, and therefore, since the music program is completed without giving the impression of having a missing part at the end, it is avoidable to give unpleasant feeling to the listener.

Figure 15:
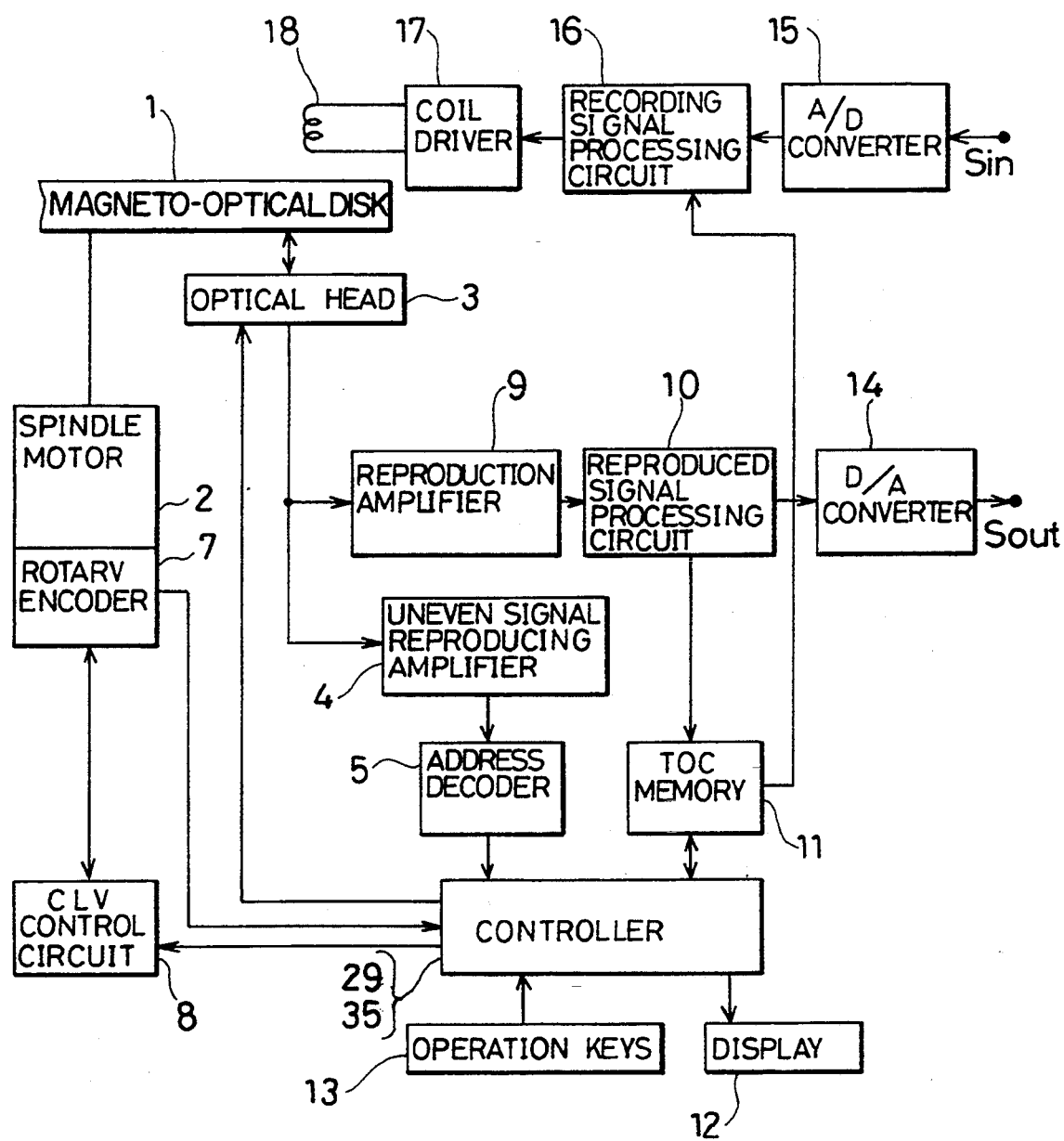
FIGS. 15 to 18 show another embodiment of the present invention.
Figure 16:
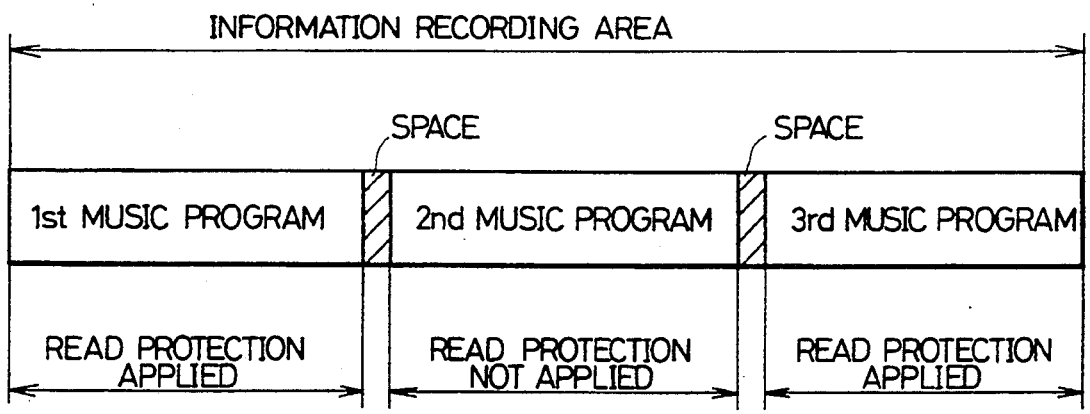

The following description will discuss still another embodiment of the present invention, referring to FIGS. 2, 15 and 16. Also in the present embodiment, the same magneto-optical disk 1 in the aforementioned embodiment is used as a re-writable disk, as shown in FIG. 2, and the device is designed to record and reproduce information by the use of data formats standardized in conventional CD's. Further, those of members having the same functions as those in the aforementioned embodiment are indicated by the same reference numerals and the description thereof is omitted.

As shown in FIG. 15, a disk recording and reproducing device of the present embodiment basically has the same arrangement as that shown in FIG. 1 except that a controller 29 is used therein instead of the controller 6 in FIG. 1. The controller 29 not only controls the whole mechanisms of the disk recording and reproducing device, but also functions as control means, which will be described later.

Moreover, a TOC memory (memory means) 11 on the one hand stores those of the signals corresponding to the contents of the TOC area 23, as shown in FIG. 2, among signals processed by a reproduced signal processing circuit 10, and on the other hand, has an arrangement such that it can store information specified by the user through operation keys 13, for example, the recording start position, pass word and the like of each music program.

A display 12 is connected to the controller 29, and the display 12 displays the music program number, time information and also the read protection information and the like of each music program, according to the contents of the TOC memory 11. Further, to the controller 29 there is connected the group of operation keys 13, whereby the user can give various instructions such as those for the aforementioned pass word.

The controller 29 also functions as control means for restraining the reproduction of recorded music programs which have corresponding read protection information, when an input pass word entered through the operation keys 13 is compared with a recorded pass word which is read from the TOC area 23 of the magneto-optical disk 1 shown in FIG. 2 and stored in the TOC memory 11 and if those pass words do not agree with each other.

As one of the methods for restraining the reproduction, such a method is proposed, wherein while driving of the optical head 3 is stopped, the control operation, which has proceeded to a routine for recording information or for reproducing information, is returned to a routine for waiting for key input in the controller 29. In addition, another method may be used, wherein instead of stopping the driving of the optical head 3, in the reproducing circuit system having a sequence from a reproduction amplifier 9 through the reproduced signal processing circuit 10 to a D/A converter 14, the operation of any one of the above circuits may be stopped so as to block the output of the reproduced signals.

Next, the following description will discuss reproducing operation in the TOC area 23. The recorded contents of the TOC area 23 include, for example, the program number, the recording start position and recording end position and the like recorded therein according to the absolute addresses 22, with respect to each of the music programs recorded in the information recording region 24 (see FIG. 2), and also include the aforementioned pass word.

When the magneto-optical disk 1 is placed on a spindle motor 2, additional information recorded in the TOC area 23 is reproduced, and when there are some pieces of additional information recorded in the TOC area 23, the contents thereof are stored in the TOC memory 11. Here, for example, it is assumed that the contents already recorded in the TOC area 23 are shown in the following Table 11.

TABLE 11

| Program No. | Recording Start Position | Recording End Position |
|---|---|---|
| 01 | (00'03") | (03'54") |
| 02 | (03'57") | (08'15") |
| 03 | (08'20") | (12'43") |

The recording start position and recording end position of each corresponding program number correspond to the time information given by the absolute addresses 22, and are read from the TOC area 23 and stored in the TOC memory 11. The controller 29 displays the above contents of the TOC memory 11 on the display 12.

Next, the following description will discuss the operation for giving read protection to each of the music programs. The user recognizes the contents of the music programs recorded in the disk 1 by the above-mentioned contents displayed, and when he wants to give read protection, for example, to the first and the third music programs, as shown in FIG. 16, he gives an instruction to do so through the operation keys 13. Upon receiving the instruction, the controller 29 permits the TOC memory 11 to store the read protection information therein. Further, the user enters a pass word to release the read protection information through the operation keys 13 (for example, when the operation keys are ten keys for selecting music programs, numbers such as "0123" are entered as the pass word). Upon receiving the instruction, the controller 29 permits the TOC memory 11 to store the pass word information therein.

As aforementioned, since the contents of the TOC memory 11 are read therefrom and stored in the TOC area 23 as additional information by the recording means including the optical head 3 and a magnetic coil 18, the read protection information is maintained in the magneto-optical disk 1 even if the magneto-optical disk 1 is removed from the disk recording and reproducing device. When the magneto-optical disk 1 is placed in the next occasion, the read protection information is read from the TOC area 23 and stored in the TOC memory 11, and therefore the read protection information once entered is effective unless it is updated. Accordingly, the read protection is executed with respect to the first and third music programs every time recording is made on the magneto-optical disk 1.

The following brief description will further discuss the reproduction of music programs recorded in the magneto-optical disk 1 having the above-mentioned read protection information.

First, the additional information recorded in the TOC area 23 of the magneto-optical disk 1 is reproduced, and the necessary information is stored in the TOC memory 11. Next, upon receiving an instruction by the user to reproduce a music program having read protection, the controller 29 on the one hand displays a message on the display 12 to show that the music program has read protection, and on the other hand requests the user to enter the pass word. When a pass word is entered by the user through the operation keys 13, the input pass word is compared with the pass word already recorded. As a result of the comparison, if those pass words do not agree with each other, the controller 29 restrains the reproduction of the music program, on the other hand, if both of the pass words agree with each other, the controller 29 permits the normal reproduction.

Thus, in the case where there are some of those music programs recorded on the magneto-optical disk 1, on which the user wants to maintain secrecy from others, all the user has to do is to enter a pass word for each of the music programs to the disk recording and reproducing device, and thereafter, only a person who knows the pass word can access to the music programs. Therefore, the demand for maintaining the secrecy to the desired music programs already recorded can be met.

Figure 17:
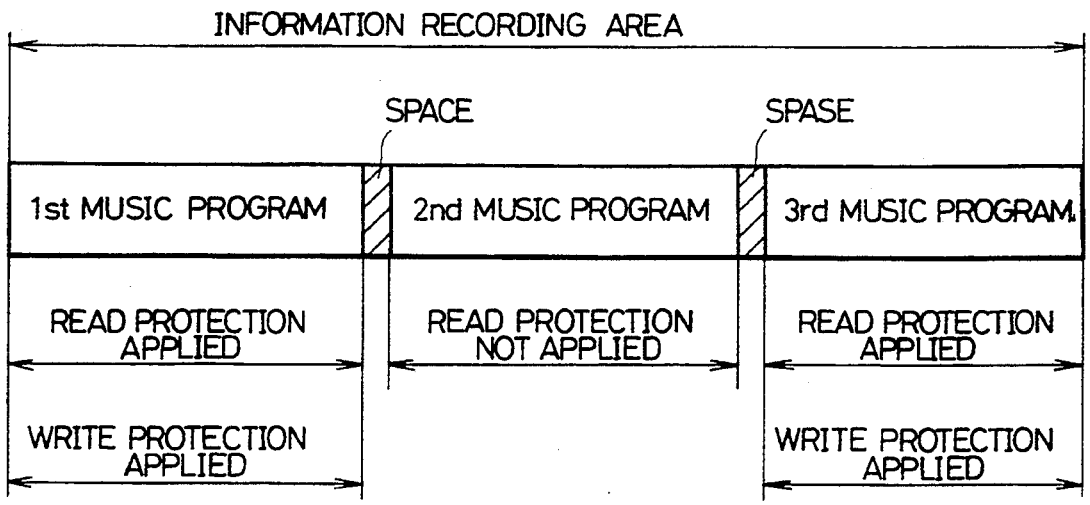

The following description will discuss a modified example of the present embodiment referring to FIGS. 15 and 17.

A disk recording and reproducing device of this embodiment has the same arrangement as that shown in FIG. 15 except that a controller 35 is installed therein instead of the controller 29 as the aforementioned control means in FIG. 15.

The controller 35, after comparing an input pass word entered through operation keys 13 and a pass word already recorded and upon receiving no agreement between those pass words, on the one hand inhibits the reproduction of a recorded music program having the corresponding read protection information, and on the other hand controls the device to automatically apply write protection to the recorded music program having the corresponding read protection, as shown in FIG. 17.

For the write protection, one of such methods is proposed, wherein while the application of light beam required for recording, which is released from an optical head 3, is stopped, the control operation, which has proceeded to a routine for recording information, is returned to a routine for waiting for key input in the controller 35.

With the above arrangement, it is preventable that another person who doesn't know the pass word may re-record another information on a range containing a recorded music program and having a read protection applied thereto, by misunderstanding that there is no music program recorded in the range because the music program having the read protection isn't reproduced. Thus, erasing important music programs is avoidable.

Figure 18:
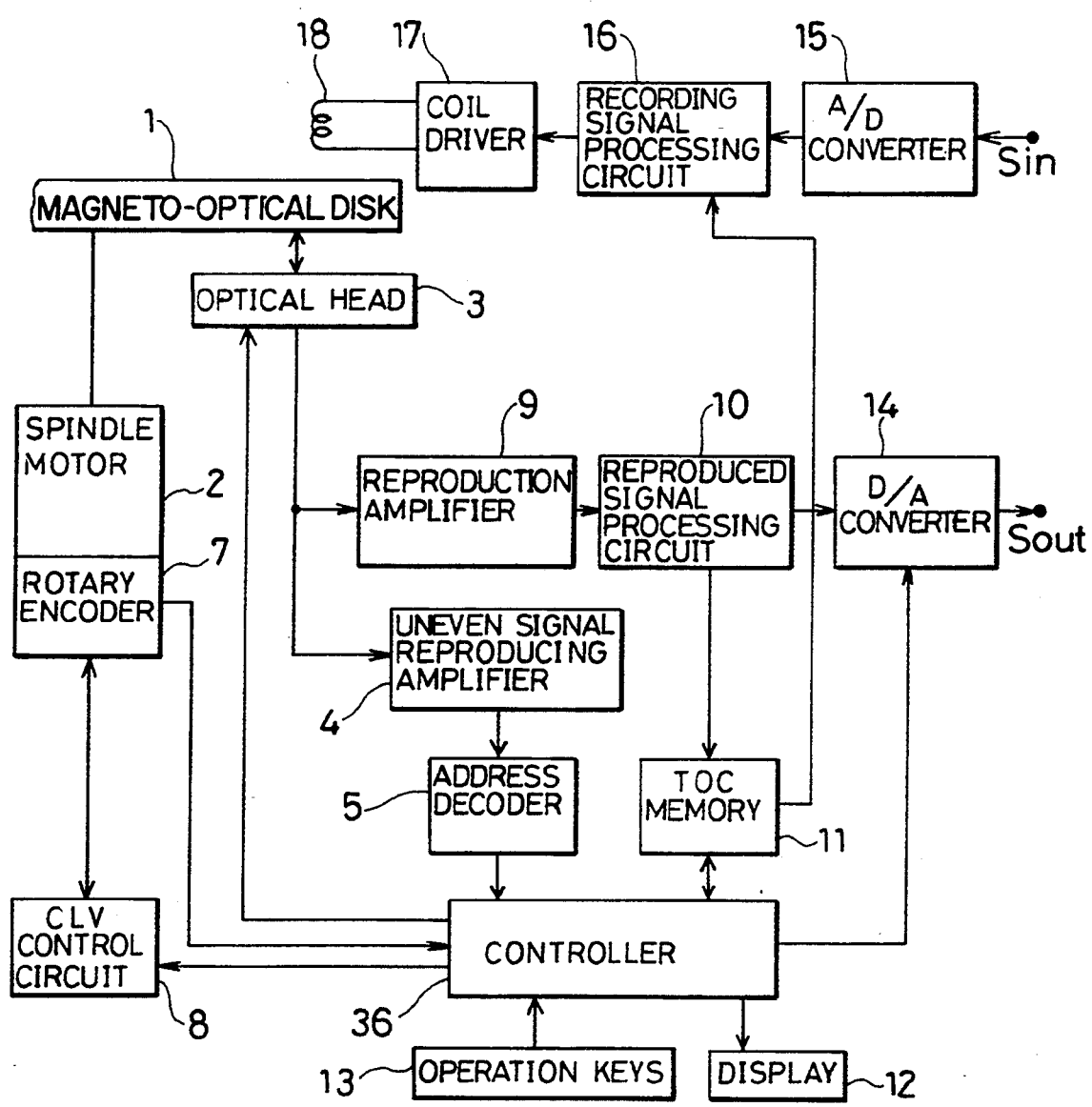

The following description will discuss another modified example of the present embodiment referring to FIG. 18.

In this embodiment, a controller 36 is installed instead of the controller 35 (FIG. 15) as the aforementioned control means. The controller 36, after comparing an input pass word entered through operation keys 13 and the aforementioned pass word already recorded and upon receiving no agreement between those pass words, controls the device to lower the quality of reproduced signals in reproducing recorded information having the corresponding read protection information.

More specifically, the controller 36 is connected to a D/A converter 14, and in reproducing information having the corresponding read protection, the controller 36 controls the D/A converter 14 to fix the low order bit of the quantizing data. Thus, the arrangement causes the resolution of the quantizing data to lower in the D/A converter 14, resulting in the lowering of the reproduced signal quality due to the lowering of the resolution.

With the above arrangement, it is preventable to provide high-quality copies of desired pieces of recorded information to another recording device, and therefore the lowering of information value due to letting others copy important information in its original form is avoidable.

In addition, another arrangement is proposed to lower the quality of the reproduced signals, wherein at a step after the D/A converter 14, is installed a variable filter, which is controlled by the controller 36. More specifically, in reproducing information having the corresponding read protection, the controller 36 controls the variable filter to narrow a frequency band for reproducing the music program so as to lower the quality of the reproduced signals.

Moreover, the quality of the reproduced signals may be lowered by giving an intermittent reproducing operation by the use of the timer installed in the controller 36 so as not to perform a successive reproducing operation, or by giving noise to the reproduced signals.

As aforementioned, the disk recording and reproducing device of the present invention comprises the operation keys which are operable by the user, the memory means for storing therein read protection information to desired pieces of recorded information and a pass word to release the read protection information, entered through the operation keys, recording means for recording in the TOC area the contents stored in the memory means as additional information, and the control means for restraining the reproduction of the recorded information having the corresponding read protection information, after comparing the input pass word entered through the operation keys and the pass word already recorded, when no agreement between those pass words is obtained.

Thus, by entering a pass word to the disk recording and reproducing device, in the reproduction thereafter, only a person who knows the pass word can access to the desired pieces of recorded information, and therefore the demand for the maintenance of the secrecy to desired pieces of recorded information can be met.

Furthermore, in the above-mentioned disk recording and reproducing device, instead of the control means, the application of another control means is proposed, which after comparing the input pass word entered through the operation keys and the pass word already recorded, when no agreement between those pass words is obtained, controls the device on the one hand to restrain the reproduction of recorded information having the corresponding read protection information, and on the other hand to apply write protection to the range of the recorded information having the corresponding read protection information. Then, the demand for the maintenance of secrecy to desired pieces of recorded information can be met, and it is preventable to erase recorded information having the corresponding read protection, or to rewrite on a range containing recorded information and having read protection applied thereto. Thus, erasing important information is avoidable.

Furthermore, in the above-mentioned disk recording and reproducing device, instead of the control means, the application of another control means is proposed, which after comparing the input pass word entered through the operation keys and the pass word already recorded, when no agreement between those pass words is obtained, controls the device to lower the quality of reproduced signals in reproducing recorded information having the corresponding read protection information.

Thus, the lowering of information value due to permitting another recording medium to copy important information in its original form is avoidable.

In addition, although in all the aforementioned embodiments, the absolute addresses 22 are formed on the magneto-optical disk 1 in the shape of pits, instead of the arrangement, the absolute addresses 22 can be recorded by modulating frequencies of the absolute addresses 22, and by wobbling the track in response to the values obtained from the modulated frequencies.

Figure 19:
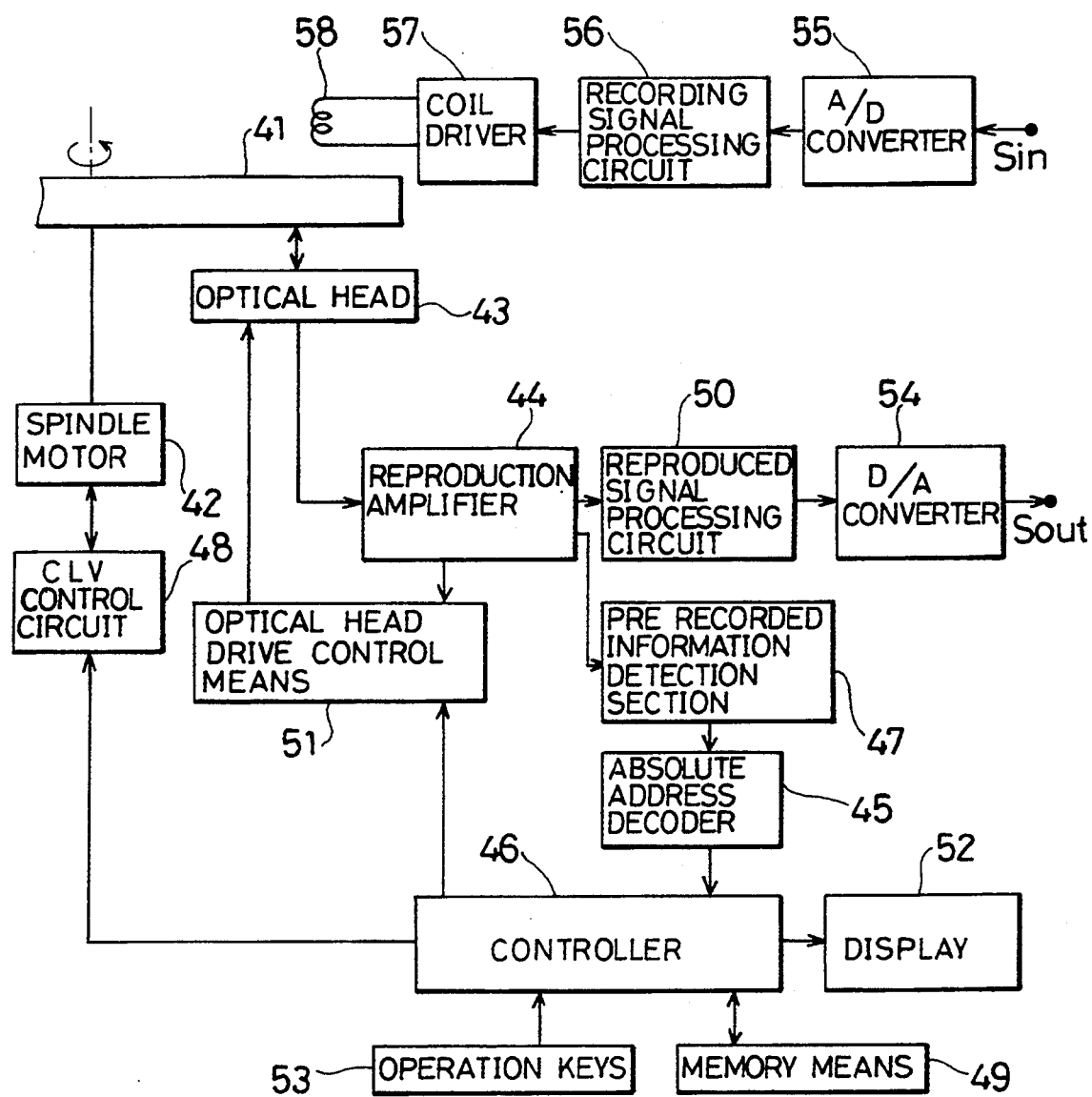
FIGS. 19 to 21 show another embodiment of the present invention.
Figure 20:
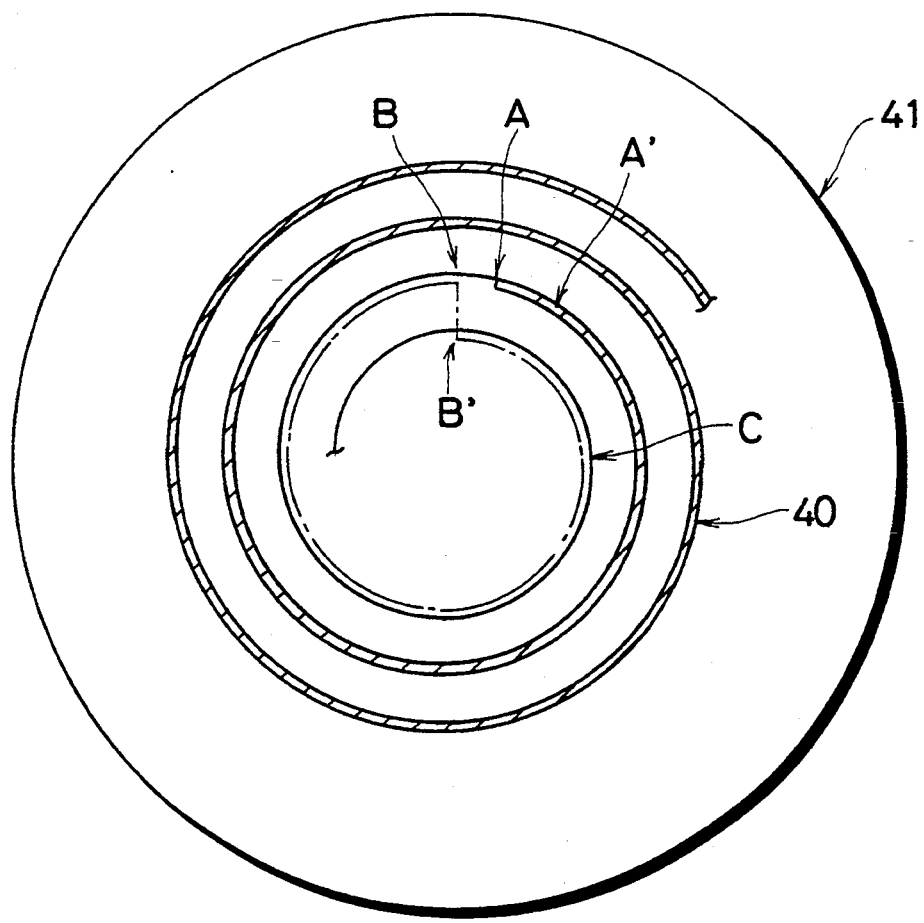

The following description will discuss another embodiment of the present invention referring to FIGS. 19 and 20. In addition, in the present embodiment a magneto-optical disk is used as a re-writable disk, and a disk recording and reproducing device is designed to record and reproduce music programs or the like by the use of data formats standardized in conventional CD's.

As shown in FIG. 20, on a magneto-optical disk 41 for use in the disk recording and reproducing device of the present embodiment, there are predeterminately formed a track 40 made of a groove in spiral shape, and absolute addresses given by the wobbling of the track 40, at least in a recording area wherein recording and reproducing operations are performed. The recording area includes an information recording area wherein pieces of information such as music programs or the like are recorded by the user, and a TOC area located in the innermost track of the magneto-optical disk 41, wherein additional information with respect to each music program recorded in the information recording area is recorded according to the absolute addresses.

As to data formats for the information recorded in the TOC area and the information recording area, as with the aforementioned embodiment, the same data formats as those for the conventional CD's are used. Further, as to the absolute addresses, the same arrangement as the aforementioned embodiment (see FIG. 4) is adopted, and therefore they are predeterminately formed by the use of wobbling so as to be reproduced in the ratio of predetermined times to one second when the magneto-optical disk 41 rotates at a predetermined linear velocity.

On the other hand, in the disk recording and reproducing device, as shown in FIG. 19, the magneto-optical disk 41 is rotatively driven by a spindle motor 42. To the spindle motor 42, there is connected a CLV control circuit 48, which controls the spindle motor 42 to rotate at a constant linear velocity.

An optical head 43 performs recording and reproduction of information by applying a light beam to the magneto-optical disk 41. Signals reproduced by the optical head 43 are amplified by a reproduction amplifier 44. Among the amplified signals, pre-recorded information signal components corresponding to the absolute addresses are detected by a pre-recorded information detection section 47, and entered to an absolute address decoder 45. The absolute address decoder 45 recognizes the values of the absolute addresses through the pre-recorded information signals entered from the pre-recorded information detection section 47, and releases them to a controller 46 which executes control operation on the whole mechanisms of the disk recording and reproducing device.

A display 52 connected to the controller 46 is designed to display the program numbers, time information and the like. Further, a group of operation keys 53 is connected to the controller 46, and through the operation keys 53, the user can give various instructions to the disk recording and reproducing device.

In the reproduction amplifier 44 connected to the optical head 43, magneto-optical signal components corresponding to music programs or the like among the signals reproduced by the optical head 43 are also amplified. A reproduced signal processing circuit 50 connected to the reproduction amplifier 44 processes the reproduced data of the music programs from the reproduction amplifier 44, which have been converted to the aforementioned data format. By the processing, the necessary data are selected to be aligned, and error correction processing is applied thereto if necessary. Digital data from the reproduced signal processing circuit 50 are converted to analog signals by a D/A converter 54 connected to the reproduced signal processing circuit 50, and the analog signals $S_{out}$ are released to an external device.

Analog signals $S_{in}$ of music programs or the like from the external device are converted to digital signals by an A/D converter 55, and the digital signals are released to a recording signal processing circuit 56. The recording signal processing circuit 56 performs processing whereby the digital signals from the A/D converter 55 are converted to recording data rows having the aforementioned data format. A coil driver 57 drives a magnetic coil 58 according to the recording signals from the recording signal processing circuit 56. The magnetic coil 58 applies an external magnetic field to the magneto-optical disk 41 in response to the recording signal.

Moreover, a memory means 49 is connected to the controller 46. The memory means 49 can store therein an absolute address corresponding to the time when one of the operation keys 53 is operated to start recording information.

An optical head drive control means 51 performs control operation for focusing and tracking in the optical head 43 according to the signals from the reproduction amplifier 44. Further, when the user judged that something was wrong with the recording of the information, and performs a predetermined operation to re-record the information, by the instruction of the controller 46 according to the above-mentioned operation, the optical head drive control means 51 accesses the optical head 43 back to a vicinity of the position indicated by the above-mentioned absolute address stored in the memory means 49, and keeps the optical head 43 in a stand-by state by making it perform track-jumps at a position slightly before the position indicated by the above-mentioned absolute address.

In the above arrangement, the following description will discuss control operation for keeping the linear velocity of the magneto-optical disk 41 constant. When the magneto-optical disk 41 is placed on the spindle motor 42, the optical head drive control means 51, by the instruction of the controller 46, on the one hand controls an optical head transportation system (not shown in Figures) to shift the optical head 43 to a position corresponding to the TOC area. At the same time, the controller 46 gives positional information indicating the position of the optical head 43 to the CLV control circuit 48. According to the positional information given by the controller 46, the CLV control circuit 48 finds the number of rotation required to obtain a predetermined linear velocity, and by controlling the actual number of rotation to have the same number as the above-mentioned, the CLV control circuit 48 rotatively drives the magneto-optical disk 41 at the required linear velocity.

Then, absolute addresses are reproduced by the optical head 43, and after being amplified by the reproduction amplifier 44 and being recognized by the address decoder 45, are entered to the controller 46. As to the aforementioned rotation control, however, the disk positional information does not necessarily conform to the actual position because of dispersions of machine accuracy and the like, and therefore it can not be said to be an accurate predetermined linear velocity. However, at this stage, no problems arise as long as the linear velocity error is within a range where at least absolute addresses can be reproduced and recognized. The controller 46, since then, successively releases accurate positional information to the CLV control circuit 48 based on the values of the absolute addresses released from the address decoder 45. Accordingly, thereinafter, an accurate CLV control operation is executed with or without the recording information.

The following description will discuss a recording operation for music programs. Analog signals $S_{in}$ for a music program entered from an external device are converted to digital signals by the A/D converter 45, and by their format being converted to the aforementioned predetermined format through the recording signal processing circuit 56, recording signals are produced. According to the recording signals, the magnetic coil 58, which is driven by the coil driver 57, applies a magnetic field onto the magneto-optical disk 41 in response to the recording signals. At the same time, from the optical head 3, a light beam with a comparatively large output is applied onto the magneto-optical disk 41. Magnetic coercive force lowers at a local part where temperature rise has occurred by the application of the light beam. In the part where the magnetic coercive force has lowered, the direction of magnetization is reversed by the magnetic field applied by the magnetic coil 48, thereby permitting the information to be recorded. Moreover, by the application of the light beam, simultaneously with the recording of the information, the reproduction of the absolute addresses predeterminately recorded can be performed.

On the other hand, in reproducing recorded music programs or the like, polarizing components whose plane of polarization rotates in accordance with the direction of magnetization on the magneto-optical disk 41 of the light beam applied thereto are detected by the optical head 43, and are converted to digital data by the reproduced signal processing circuit 50 after being amplified by the reproduction amplifier 44. The digital signals are released to the external device as analog output signals $S_{out}$ by the D/A converter 54.

In the aforementioned recording operation for the music programs, for example, in recording music programs recorded on another recording medium as a music source, it is possible for the user himself to instruct to start a recording operation through the operation keys 53 by choosing a right timing while listening to the music program of the source. However, in such recording operation for music programs, the leading part of the music programs is sometimes not recorded due to wrong timing in starting the recording operation. Noticing the wrong timing, the user sometimes suspends the operation halfway, and then he sometimes resumes the recording operation. In that case, in order to start the recording to be resumed from a position slightly before the start position of the preceding music program whose recording resulted in failure, as shown in FIG. 20, an absolute address A' indicating the recording start time is stored in the memory means 49. Then, in resuming the recording operation, by reading the absolute address A', the optical head 43 is accessed to a position indicated by the absolute address A', and is kept in a stand-by state while being permitted to make track-jumps at a position B slightly before the position of the absolute address A'. In this case, the route of the light spot is expressed by a loop shown in an alternate long and short dash line in the figure.

Figure 22:
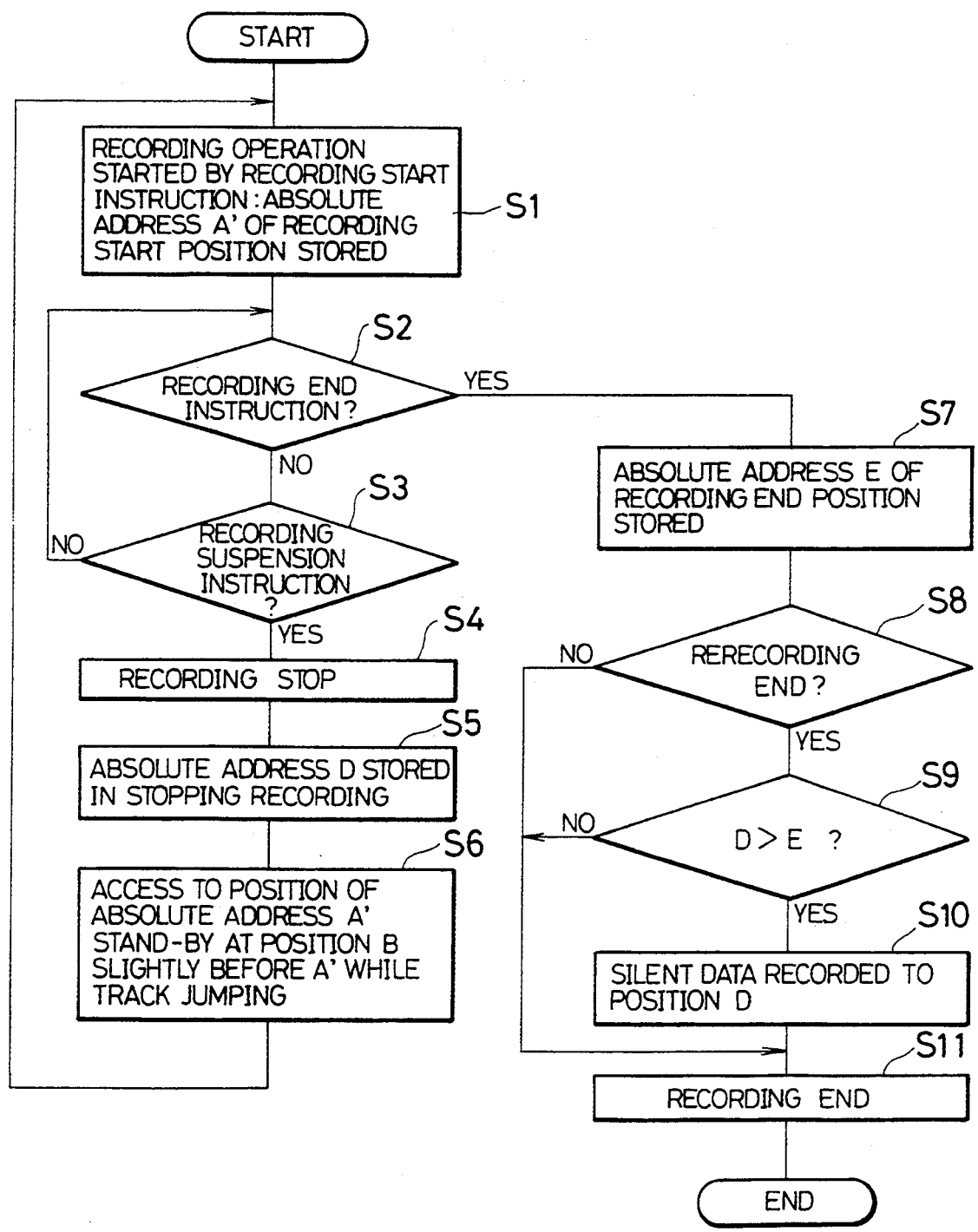
FIG. 22 is a flow chart showing recording and re-recording operations.
Figure 23:
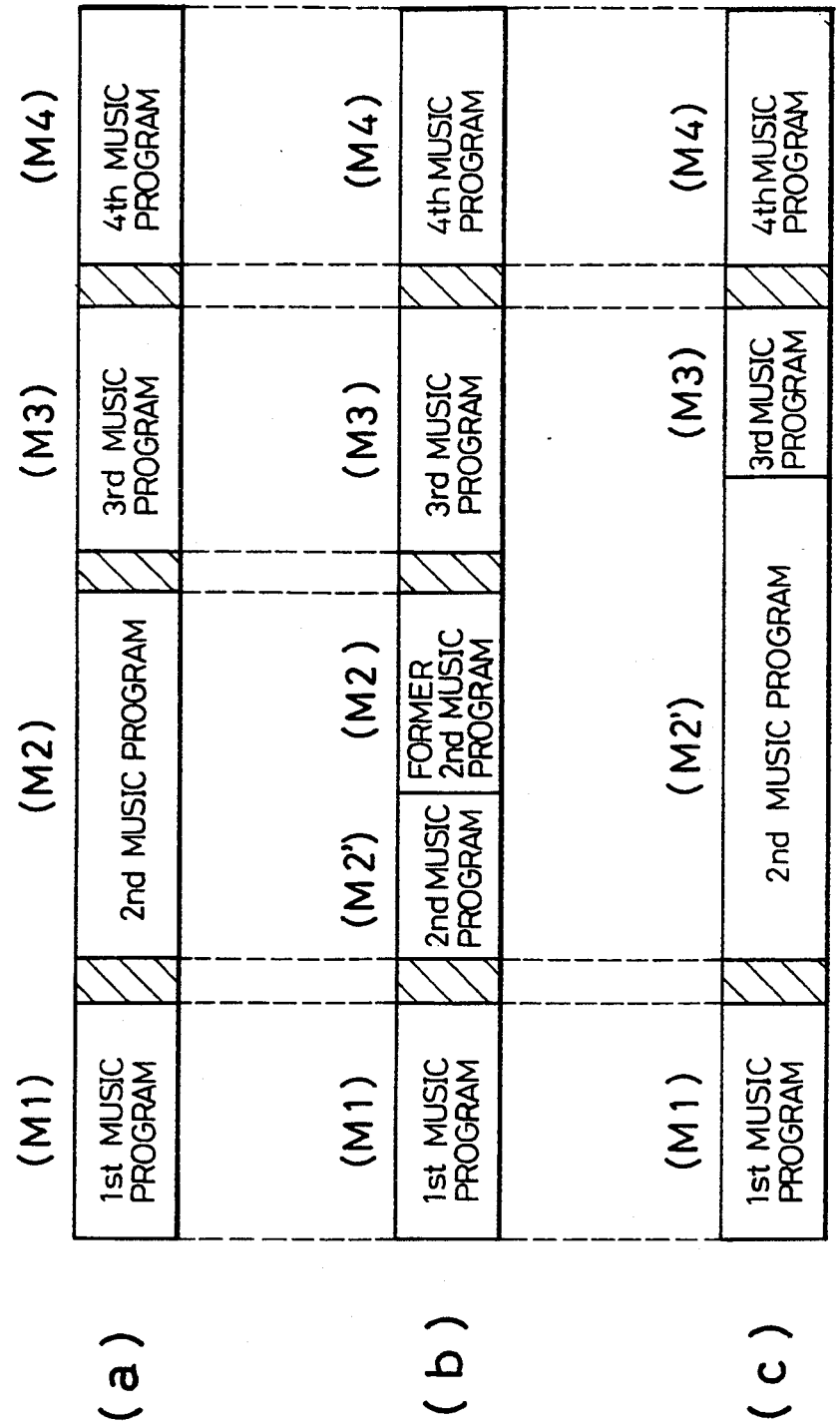
FIGS. 23 to 26 are diagrams showing the prior arts.
Figure 24:
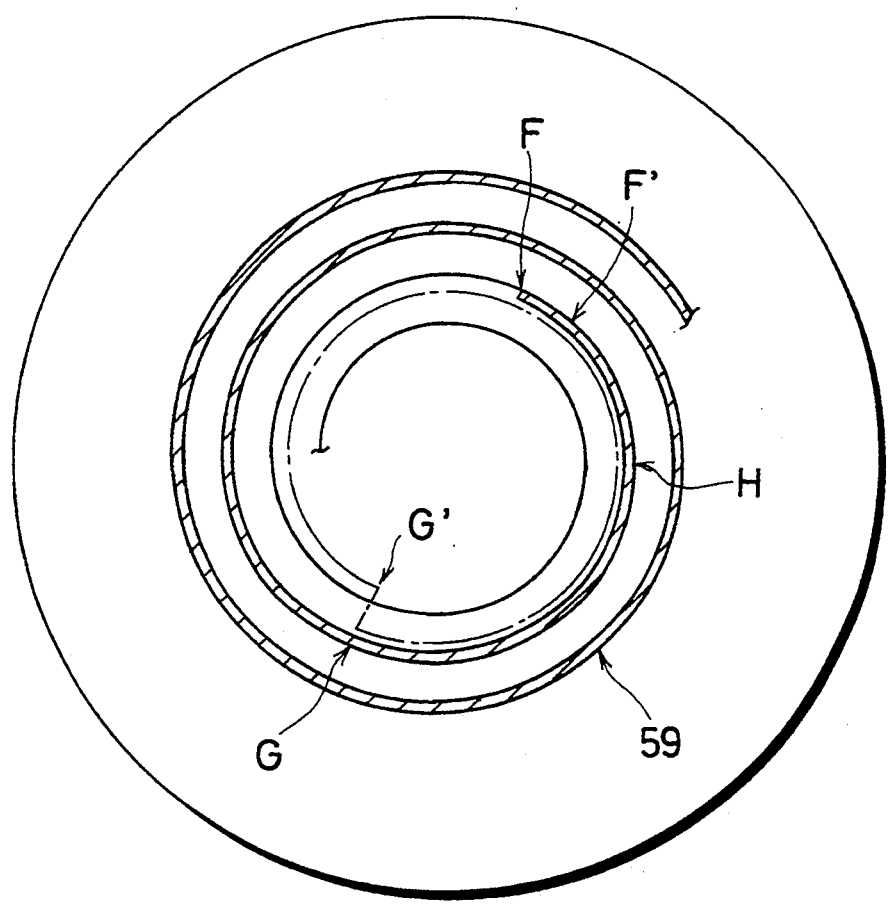
Figure 25:
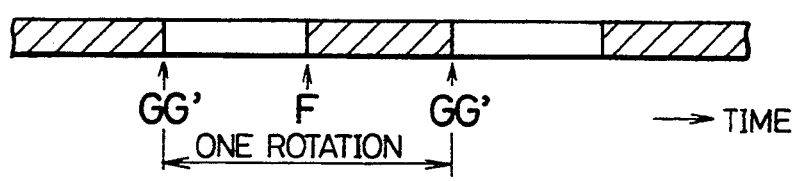
Figure 26:
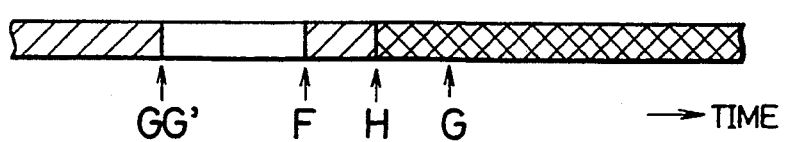

Referring to the flow chart of FIG. 22, the following explanation will discuss the operation which is performed since the start of the re-recording until the completion of the re-recording, including the aforementioned operation.

A recording operation is started by the instruction of the user to start recording, and an absolute address A' indicating a recording start position A is stored in the memory means 49 (S1). Next, it is judged whether an instruction to complete the recording operation is entered or not (S2), and if there is no instruction for the completion, it is judged whether instructions to suspend the recording operation are entered or not, during the recording (S3). In addition, in the present embodiment, the aforementioned instruction to suspend the recording is referred to as a predetermined operation which is performed by the user so as to resume the recording after judging that something is wrong with the preceding recording of information.

Once the instruction to suspend the recording is entered, the recording is stopped (S4), and an absolute address D indicating a recording stop position is stored in the memory means 49 (S5). Then, the optical head 43 is accessed to a vicinity of the position of the absolute address A' indicating the recording start of the music program whose recording has been suspended, and is kept in a stand-by state while being permitted to make track-jumps at a position B slightly before the position of the absolute address A'. Thereinafter, the sequence proceeds to the S1, and a re-recording operation is started when an instruction to start recording is given by the user (S1).

Figure 21:
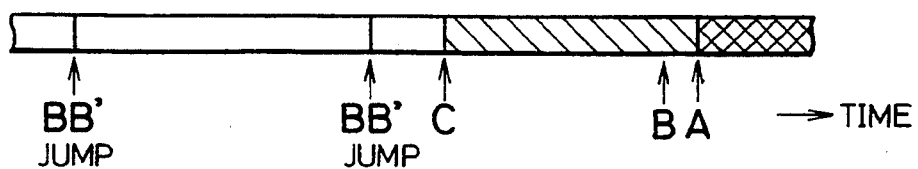

With the above-mentioned re-recording operation, the recording is started at a position C just before the former recording start position A, as shown in FIG. 21, and thus the re-recording operation is performed with complete overlapping. Therefore it is surely preventable that the leading part of the former recorded information might be reproduced, even if it is a short period of time.

When an instructions to complete the re-recording operation is entered (S2), the sequence proceeds to S7, and an absolute address E indicating the re-recording end position is stored (S7). Then, it is judged whether the recording operation is a normal recording operation or a re-recording operation (S8), and if it is a re-recording operation, it is judged whether the position of the absolute address E indicating the recording end position of the newly recorded music program reaches the position of the absolute address D indicating the end position of the former music program or not (S9), and if it does not, soundless data is recorded up to the position of the absolute address D (S10), and then the re-recording operation is completed (S11).

In addition, although soundless data are recorded in the arrangement of the present embodiment as abovementioned, the arrangement is not necessarily effective, and depending on the types of recording, since there are cases where the application of the soundless data is not necessary, it should be selectively applied according to the necessity.

As aforementioned, the disk recording and reproducing device of the present invention comprises: the operation keys for being operated by the user; the memory means wherein the contents of an absolute address corresponding to the time at which the operation key is operated to initiate recording of information are stored; and the optical head driving control means for moving the optical head back to a vicinity of the position indicated by the absolute address stored in the memory means and for keeping the optical head in a stand-by state by making it perform track-jumps at a position slightly before the position indicated by the absolute address when the user, after judging that something was wrong with the recording of the information, performs a predetermined operation to re-record the information.

The arrangement makes it possible to promptly meet the demand for the re-recording operation, to perform the re-recording operation with complete overlapping, and to surely prevent that the leading part of the former recorded information might be reproduced even if it is a short period of time.

Further, in all the above embodiments, the explanations were given on the magneto-optical disk as an example of a re-writable disk; however, re-writable disks of other types such as optical disks of phase transition type may be used.

Moreover, in all the above embodiments, music programs are taken up as an example of information to be recorded; however, information of other types, for example, such as data for computers or the like may be recorded on the re-writable disk of the present invention.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A disk recording and reproducing device for recording and reproducing information on and from a re-writable recording disk having absolute addresses, an information recording area where information entered from external devices is recorded and a TOC area wherein additional information with respect to each piece of the information recorded in the information recording area is recorded, comprising:

operation keys which are operable by a user for entering defective part information in the TOC area;

memory means for storing therein the defective part information indicating recording/reproduction unavailable parts in the information recording area;

recording means for recording the defective part information stored in the memory means in the TOC area; and control means for controlling read/write operations according to the defective part information.

2. A disk recording and reproducing device as set forth in claim 1, wherein there is read/write control information that includes write protection information for entering through the operation keys with respect to desired pieces of recorded information, and the control means is a controller for restraining writing operation in a write protection range which is an area .in the disk wherein writing operation is inhibited.

3. A disk recording and reproducing device as set forth in claim 2, wherein the write protection information is a piece of information providing means for inhibiting the writing operation in the information recording area, wherein the recorded information is located.

4. A disk recording and reproducing device as set forth in claim 2, wherein the write protection information is a piece of information providing means for inhibiting the writing operation in an area wherein the recorded information is located, which location is an area located between a first piece of information and a succeeding piece of information.

5. A disk recording and reproducing device as set forth in claim 2, wherein there is additional information for entering that includes a program number, a recording start position, a recording end position or a length from the recording start position to the recording end position, and the write protection information.

6. A disk recording and reproducing device as set forth in claim 2 further comprises a fader circuit for applying fade-out processing to a specific piece of information slightly before the end of a non-write-protection range when the specific piece of information is written in the non-write-protection range.

7. A disk recording and reproducing device as set forth in claim 1, wherein there is read/write control information for entering that includes read protection information with respect to specific recorded information and a pass word for releasing the read protection information, the read protection information and the pass word being entered through the operation keys.

8. A disk recording and reproducing device as set forth in claim 7, wherein the read protection information is a piece of information for inhibiting a reading operation of the relevant recorded information from the information recording area.

9. A disk recording and reproducing device as set forth in claim 8, wherein there is additional information that includes a program number, a recording start position, a recording end position, or a length from the recording start position to the recording end position, and the read protection information of each piece of the information and the pass word.

10. A disk recording and reproducing device as set forth in claim 7, wherein the control means is a controller for controlling the device when a pass word entered through the operation keys is compared with a pass word already recorded and if those pass words do not agree with each other, to inhibit reading operation of specific recorded information.

11. A disk recording and reproducing device as set forth in claim 7, wherein the control means is a controller for controlling the device when a pass word entered through the operation keys is compared with a pass word already recorded and if those pass words do not agree with each other, to inhibit reading operation of relevant recorded information, and to automatically apply write protection to a range wherein the relevant recorded information is located when a pass word entered through the operation keys is compared with a pass word already recorded and if those pass words do not agree with each other.

12. A disk recording and reproducing device as set forth in claim 7, wherein the control means is a controller for controlling the device when a pass word entered through the operation keys is compared with a pass word already recorded and if those pass words do not agree with each other, to lower the quality of read signals in reading operation of relevant recorded information.

13. A disk recording and reproducing device as set forth in claim 3, or claim 7, wherein the information includes data for use in computers.

14. A disk recording and reproducing device as set forth in claim 1, wherein the memory means is a TOC memory, so that a reading or writing operation can be performed freely therefrom.

15. The disk recording and reproducing device according to claim 1 further comprising:

means for successively displaying information indicative of a corresponding position on a recording medium during recording/reproducing operation and for displaying information regarding a position on the recording medium as defective part information.

16. The disk recording and reproducing device according to claim 15, wherein the means for displaying includes means for displaying the defective part information that is stored in said memory means.

17. The disk recording and reproducing device according to claim 16, wherein the means for displaying includes means for displaying bright and dark areas including bars corresponding to defective ranges and used ranges, so that a user can recognize writable areas clearly and promptly.

18. A disk recording and reproducing device as set forth in claim 1, wherein the information includes pieces of music information.

19. A disk recording and reproducing device as set forth in claim 1, wherein the recording means may be an optical head for applying a light beam to the disk and a magnetic coil for applying a magnetic field to the disk.

20. A disk recording and reproducing device for recording and reproducing information on and from a re-writable recording disk having absolute addresses, an information recording area where information entered from external devices is recorded and a TOC area wherein additional information with respect to each piece of the information recorded in the information recording area is recorded, comprising:

operation keys which are operable by a user for entering defective part information;

memory means for storing therein defective part information entered by the operation keys indicating recording/reproduction unavailable parts in the information recording area;

recording means for recording the defective part information stored in the memory means in the TOC area; and control means for controlling read/write operations according to the defective part information.

* * * * *